United States Patent
Tomer

(10) Patent No.: US 11,506,877 B2
(45) Date of Patent: Nov. 22, 2022

(54) IMAGING INSTRUMENT HAVING OBJECTIVE AXIS AND LIGHT SHEET OR LIGHT BEAM PROJECTOR AXIS INTERSECTING AT LESS THAN 90 DEGREES

(71) Applicant: The Trustees of Columbia University in the City of New York, New York, NY (US)

(72) Inventor: Raju Tomer, Tenafly, NJ (US)

(73) Assignee: The Trustees of Columbia University in the City of New York, New York, NY (US)

(*) Notice: Subject to any disclaimer, the term of this patent is extended or adjusted under 35 U.S.C. 154(b) by 476 days.

(21) Appl. No.: 16/347,406

(22) PCT Filed: Nov. 10, 2017

(86) PCT No.: PCT/US2017/061165
§ 371 (c)(1),
(2) Date: May 3, 2019

(87) PCT Pub. No.: WO2018/089839
PCT Pub. Date: May 17, 2018

(65) Prior Publication Data
US 2019/0310451 A1 Oct. 10, 2019

Related U.S. Application Data

(60) Provisional application No. 62/473,944, filed on Mar. 20, 2017, provisional application No. 62/420,349, filed on Nov. 10, 2016.

(51) Int. Cl.
*G01N 21/64* (2006.01)
*G02B 21/00* (2006.01)

(52) U.S. Cl.
CPC ..... *G02B 21/0032* (2013.01); *G01N 21/6458* (2013.01); *G02B 21/0076* (2013.01); *G02B 2207/113* (2013.01)

(58) Field of Classification Search
CPC .............................................. G02B 21/00–368
See application file for complete search history.

(56) References Cited

U.S. PATENT DOCUMENTS

| 4,149,074 A | 4/1979 | Schliepe et al. |
| 4,181,436 A | 1/1980 | Wasmund et al. |

(Continued)

FOREIGN PATENT DOCUMENTS

| WO | 2012122027 A2 | 9/2012 |
| WO | 2013150273 A1 | 10/2013 |

(Continued)

OTHER PUBLICATIONS

Gao, "Extend the field of view of selective plan illumination microscopy by tiling the excitation light sheet", Optical Society of America, published Feb. 26, 2015, Optics Express pp. 6102-6111 (Year: 2015).*

(Continued)

*Primary Examiner* — Ryan S Dunning
(74) *Attorney, Agent, or Firm* — Potomac Law Group, PLLC

(57) ABSTRACT

Light Sheet Theta (LS-0) Microscopy achieves large sample imaging capabilities without affecting the imaging depth or the image quality. An optical layout places a detection objective normal to the sample surface, while placing the illumination objectives that generate light sheets at an angle (theta) significantly smaller than 90 degrees. In this configuration, the light sheets enter from same side of the sample as the detection objective. The intersection of the light-sheet and the detection focal plane results in a line (Continued)

illumination-detection profile that is discriminated by a camera.

21 Claims, 13 Drawing Sheets

(56) References Cited

U.S. PATENT DOCUMENTS

| | | |
|---|---|---|
| 4,218,112 A | 8/1980 | Ruker |
| 4,284,897 A | 8/1981 | Sawamura et al. |
| 4,349,242 A | 9/1982 | Ogura |
| 4,446,548 A | 5/1984 | Bouwhuis et al. |
| 4,537,477 A | 8/1985 | Takagi et al. |
| 4,604,523 A | 8/1986 | Knowles et al. |
| 4,627,730 A | 12/1986 | Jungerman et al. |
| 4,631,581 A | 12/1986 | Carlsson |
| 4,691,103 A | 9/1987 | Poole et al. |
| 4,700,298 A | 10/1987 | Palcic et al. |
| 4,732,473 A | 3/1988 | Bille et al. |
| 4,733,063 A | 3/1988 | Kimura et al. |
| 4,734,578 A | 3/1988 | Horikawa |
| 4,745,270 A | 5/1988 | Horikawa et al. |
| 4,791,288 A | 12/1988 | Kinameri et al. |
| 4,800,269 A | 1/1989 | Horikawa |
| 4,806,004 A | 2/1989 | Wayland |
| 4,812,748 A | 3/1989 | Brust et al. |
| 4,824,229 A | 4/1989 | Narita et al. |
| 4,845,552 A | 7/1989 | Jaggi et al. |
| 4,861,982 A | 8/1989 | Smid et al. |
| 4,873,434 A | 10/1989 | See et al. |
| 4,914,293 A | 4/1990 | Hayashi et al. |
| 4,954,722 A | 9/1990 | Fine et al. |
| 4,972,258 A | 11/1990 | Wolf et al. |
| 4,987,303 A | 1/1991 | Takase et al. |
| 5,033,834 A | 7/1991 | Corder et al. |
| 5,038,035 A | 8/1991 | Nishimura et al. |
| 5,043,570 A | 8/1991 | Takabayashi |
| 5,081,349 A | 1/1992 | Iwasaki |
| 5,081,350 A | 1/1992 | Iwasaki et al. |
| 5,086,222 A | 2/1992 | Shibuya |
| 5,103,095 A | 4/1992 | Elings et al. |
| 5,168,157 A | 12/1992 | Kimura |
| 5,172,002 A | 12/1992 | Marshall |
| 5,184,012 A | 2/1993 | Yamamoto |
| 5,204,531 A | 4/1993 | Elings et al. |
| 5,214,279 A | 5/1993 | Hakamata |
| 5,218,195 A | 6/1993 | Hakamata |
| 5,225,923 A | 7/1993 | Montagu |
| 5,225,929 A | 7/1993 | Ulanowski |
| 5,250,965 A | 10/1993 | Abe et al. |
| 5,260,562 A | 11/1993 | Bearden et al. |
| 5,276,324 A | 1/1994 | Ohtaki et al. |
| 5,276,325 A | 1/1994 | Todokoro et al. |
| 5,306,919 A | 4/1994 | Elings et al. |
| 5,343,038 A | 8/1994 | Nishiwaki et al. |
| 5,355,252 A | 10/1994 | Haraguchi |
| 5,376,790 A | 12/1994 | Linker et al. |
| 5,450,501 A | 9/1995 | Smid |
| 5,508,517 A | 4/1996 | Onuki et al. |
| 5,535,052 A | 7/1996 | Jorgens |
| 5,617,500 A | 4/1997 | Shionoya et al. |
| 5,621,532 A | 4/1997 | Ooki et al. |
| 5,672,816 A | 9/1997 | Park et al. |
| 5,693,938 A | 12/1997 | Marchman et al. |
| 5,777,732 A | 7/1998 | Hanninen et al. |
| 5,790,710 A | 8/1998 | Price et al. |
| 5,828,459 A | 10/1998 | Silberberg |
| 5,835,228 A | 11/1998 | Okazaki et al. |
| 5,835,265 A | 11/1998 | Mammone |
| 5,929,439 A | 7/1999 | Fodokoro et al. |
| 5,930,033 A | 7/1999 | Inoue et al. |
| 5,945,669 A | 8/1999 | Arai |
| 5,978,155 A | 11/1999 | Suenaga |
| 6,034,815 A | 3/2000 | Shimada |
| 6,037,583 A | 3/2000 | Moehler et al. |
| 6,043,932 A | 3/2000 | Kusunose |
| 6,049,421 A | 4/2000 | Raz et al. |
| 6,094,300 A | 7/2000 | Kashima et al. |
| 6,104,539 A | 8/2000 | Togino |
| 6,127,681 A | 10/2000 | Sato et al. |
| 6,144,028 A | 11/2000 | Kley |
| 6,147,797 A | 11/2000 | Lee |
| 6,166,385 A | 12/2000 | Webb et al. |
| 6,167,173 A | 12/2000 | Schoeppe et al. |
| 6,184,535 B1 | 2/2001 | Kashima et al. |
| 6,222,961 B1 | 4/2001 | Engelhardt et al. |
| 6,262,423 B1 | 7/2001 | Hell et al. |
| 6,269,206 B1 | 7/2001 | Simon et al. |
| 6,278,555 B1 | 8/2001 | Stock et al. |
| 6,320,174 B1 | 11/2001 | Tafas et al. |
| 6,337,474 B1 | 1/2002 | Morizono |
| 6,337,479 B1 | 1/2002 | Kley |
| 6,356,088 B1 | 3/2002 | Simon et al. |
| 6,381,074 B2 | 4/2002 | Koshida |
| 6,426,834 B1 | 7/2002 | Braunecker et al. |
| 6,433,929 B1 | 8/2002 | Sasaki |
| 6,441,356 B1 | 8/2002 | Mandella et al. |
| 6,449,039 B1 | 9/2002 | Bouzid |
| 6,466,040 B1 | 10/2002 | Simon et al. |
| 6,521,899 B1 | 2/2003 | Wolleschensky |
| 6,525,812 B1 | 2/2003 | Hartmann et al. |
| 6,555,802 B2 | 4/2003 | Osipchuk et al. |
| 6,567,164 B2 | 5/2003 | Birk et al. |
| 6,573,500 B2 | 6/2003 | Yeremin et al. |
| 6,580,554 B2 | 6/2003 | Engelhardt et al. |
| 6,594,074 B1 | 7/2003 | Wolleschensky et al. |
| 6,608,294 B2 | 8/2003 | Nikitin et al. |
| 6,608,295 B2 | 8/2003 | Engelhardt |
| 6,608,717 B1 | 8/2003 | Medford et al. |
| 6,611,643 B2 | 8/2003 | Birk et al. |
| 6,617,761 B2 | 9/2003 | Ando et al. |
| 6,628,385 B1 | 9/2003 | Osipchuk et al. |
| 6,642,504 B2 | 11/2003 | Cathey, Jr. |
| 6,654,166 B2 | 11/2003 | Birk et al. |
| 6,657,187 B2 | 12/2003 | Engelhardt |
| 6,674,573 B2 | 1/2004 | Suzuki |
| 6,686,587 B2 | 2/2004 | Nikitin et al. |
| 6,693,742 B1 | 2/2004 | Winterot et al. |
| 6,693,945 B1 | 2/2004 | Shimada |
| 6,703,621 B2 | 3/2004 | Wolleschensky |
| 6,710,316 B2 | 3/2004 | Mandella et al. |
| 6,710,337 B2 | 3/2004 | Engelhardt et al. |
| 6,710,918 B2 | 3/2004 | Birk et al. |
| 6,711,283 B1 | 3/2004 | Soenksen |
| 6,717,723 B2 | 4/2004 | Arai |
| 6,717,726 B2 | 4/2004 | Boehm et al. |
| 6,721,690 B2 | 4/2004 | Olschewski |
| 6,754,000 B2 | 6/2004 | Engelhardt et al. |
| 6,771,417 B1 | 8/2004 | Wolleschensky et al. |
| 6,788,456 B2 | 9/2004 | Knebel |
| 6,796,699 B2 | 9/2004 | Birk et al. |
| 6,813,050 B2 | 11/2004 | Chen et al. |
| 6,824,056 B1 | 11/2004 | Karin |
| 6,848,825 B1 | 2/2005 | Simon et al. |
| 6,850,363 B1 | 2/2005 | Wendenburg et al. |
| 6,852,964 B2 | 2/2005 | Engelhardt et al. |
| 6,853,455 B1 | 2/2005 | Dixon et al. |
| 6,856,391 B2 | 2/2005 | Garab et al. |
| 6,882,470 B2 | 4/2005 | Bloedorn et al. |
| 6,900,435 B1 | 5/2005 | Lewis |
| 6,900,935 B2 | 5/2005 | Engelhardt et al. |
| 6,906,312 B2 | 6/2005 | Engelhardt |
| 6,909,542 B2 | 6/2005 | Sasaki |
| 6,914,236 B2 | 7/2005 | Hoffmann |
| 6,927,902 B2 | 8/2005 | Schoeppe |
| 6,934,020 B2 | 8/2005 | Shimada |
| 6,940,649 B2 | 9/2005 | Dowski, Jr. |
| 6,943,332 B2 | 9/2005 | Suzuki |
| 6,952,006 B2 | 10/2005 | Moellmann |
| 6,958,858 B2 | 10/2005 | Engelhardt et al. |
| 6,963,398 B2 | 11/2005 | Sasaki et al. |
| 6,967,725 B2 | 11/2005 | Denk et al. |
| 6,967,772 B2 | 11/2005 | Harris |
| 6,978,215 B2 | 12/2005 | Nikitin |

(56) References Cited

U.S. PATENT DOCUMENTS

| | | |
|---|---|---|
| 6,987,274 B1 | 1/2006 | Street et al. |
| 7,002,739 B2 | 2/2006 | Awamura |
| 7,009,171 B2 | 3/2006 | Sasaki |
| 7,009,763 B1 | 3/2006 | Wolleschensky |
| 7,015,485 B2 | 3/2006 | Kitagawa |
| 7,034,317 B2 | 4/2006 | Olszak et al. |
| 7,035,478 B2 | 4/2006 | Crandall et al. |
| 7,050,208 B2 | 5/2006 | Overbeck |
| 7,057,806 B2 | 6/2006 | Atkinson |
| 7,079,256 B2 | 7/2006 | Li |
| 7,088,517 B2 | 8/2006 | Spiecker |
| 7,092,086 B2 | 8/2006 | Knebel |
| 7,098,447 B2 | 8/2006 | Moellmann |
| 7,110,118 B2 | 9/2006 | Ünlü et al. |
| 7,115,885 B2 | 10/2006 | Hell |
| 7,116,437 B2 | 10/2006 | Weinstein et al. |
| 7,123,790 B2 | 10/2006 | Rosman et al. |
| 7,129,486 B2 | 10/2006 | Spizig et al. |
| 7,130,115 B2 | 10/2006 | Olszak et al. |
| 7,141,802 B2 | 11/2006 | Takeyama et al. |
| 7,142,308 B2 | 11/2006 | Somekh et al. |
| 7,151,633 B2 | 12/2006 | Storz et al. |
| 7,154,084 B2 | 12/2006 | Hara |
| 7,158,224 B2 | 1/2007 | Montagu |
| 7,184,610 B2 | 2/2007 | Weinstein et al. |
| 7,187,493 B2 | 3/2007 | Sasaki et al. |
| 7,187,494 B2 | 3/2007 | Nishiwaki et al. |
| 7,193,775 B2 | 3/2007 | Olszak et al. |
| 7,202,953 B1 | 4/2007 | Mueller et al. |
| 7,212,337 B2 | 5/2007 | Lange et al. |
| 7,212,338 B2 | 5/2007 | Weyh et al. |
| 7,218,762 B2 | 5/2007 | Olschewski |
| 7,233,437 B2 | 6/2007 | Hirata et al. |
| 7,253,420 B2 | 8/2007 | Motomura |
| 7,253,950 B2 | 8/2007 | Araya |
| 7,257,289 B2 | 8/2007 | Dlschewski |
| 7,260,253 B2 | 8/2007 | Rahn et al. |
| 7,271,382 B2 | 9/2007 | Engelmann et al. |
| 7,271,952 B2 | 9/2007 | Suzuki et al. |
| 7,274,446 B2 | 9/2007 | Wolleschensky et al. |
| 7,283,297 B2 | 10/2007 | Knebel |
| 7,298,461 B2 | 11/2007 | Cremer et al. |
| 7,301,696 B2 | 11/2007 | Wolleschensky |
| 7,304,790 B2 | 12/2007 | Kawano et al. |
| 7,339,148 B2 | 3/2008 | Kawano et al. |
| 7,342,219 B2 | 3/2008 | Araya et al. |
| 7,385,165 B2 | 6/2008 | Aikawa |
| 7,385,709 B2 | 6/2008 | Plamann et al. |
| 7,388,714 B2 | 6/2008 | Liang et al. |
| 7,394,482 B2 | 7/2008 | Olschewski |
| 7,397,601 B2 | 7/2008 | Laudo |
| 7,411,166 B2 | 8/2008 | Wolleschensky et al. |
| 7,450,243 B2 | 11/2008 | Marks et al. |
| 7,457,331 B2 | 11/2008 | Riedmann et al. |
| 7,468,834 B2 | 12/2008 | Wolleschensky |
| 7,477,449 B2 | 1/2009 | Knebel et al. |
| 7,485,856 B2 | 2/2009 | Kley |
| 7,489,828 B2 | 2/2009 | Asad et al. |
| 7,508,582 B2 | 3/2009 | Lauer |
| 7,511,890 B2 | 3/2009 | Ulrich et al. |
| 7,518,652 B2 | 4/2009 | Olson et al. |
| 7,518,764 B2 | 4/2009 | Osborne et al. |
| 7,518,790 B2 | 4/2009 | Sase et al. |
| 7,535,640 B2 | 5/2009 | Totzeck et al. |
| 7,542,597 B2 | 6/2009 | Rahn et al. |
| 7,547,874 B2 | 6/2009 | Liang |
| 7,551,350 B2 | 6/2009 | Iketaki et al. |
| 7,554,669 B2 | 6/2009 | Buckland et al. |
| 7,556,968 B2 | 7/2009 | Ando et al. |
| 7,560,709 B2 | 7/2009 | Kimura et al. |
| 7,561,327 B2 | 7/2009 | Riedmann |
| 7,564,621 B2 | 7/2009 | Kawano et al. |
| 7,580,185 B2 | 8/2009 | Haisch et al. |
| 7,589,891 B2 | 9/2009 | Kawasaki |
| 7,630,113 B2 | 12/2009 | Sase et al. |
| 7,633,053 B2 | 12/2009 | Wolleschensky et al. |
| 7,643,155 B2 | 1/2010 | Marks et al. |
| 7,659,991 B2 | 2/2010 | Seitz |
| 7,660,035 B2 | 2/2010 | Böhm et al. |
| 7,668,362 B2 | 2/2010 | Olson et al. |
| 7,696,996 B2 | 4/2010 | Hattori et al. |
| 7,728,270 B2 | 6/2010 | Wolleschensky et al. |
| 7,733,565 B2 | 6/2010 | Hattori et al. |
| 7,742,213 B2 | 6/2010 | Potsaid et al. |
| 7,755,841 B2 | 7/2010 | Christenson et al. |
| 7,773,278 B2 | 8/2010 | Chu et al. |
| 7,796,149 B2 | 9/2010 | Steinert |
| 7,802,027 B2 | 9/2010 | Schek |
| 7,804,642 B2 | 9/2010 | Nagasawa et al. |
| 7,820,958 B2 | 10/2010 | Ishihara et al. |
| 7,843,572 B2 | 11/2010 | Tearney et al. |
| 7,865,007 B2 | 1/2011 | Yamada |
| 7,869,039 B2 | 1/2011 | Akao et al. |
| 7,872,799 B2 | 1/2011 | Wolleschensky |
| 7,873,241 B2 | 1/2011 | Storz et al. |
| 7,885,448 B2 | 2/2011 | Bartels |
| 7,903,329 B2 | 3/2011 | Yoshida et al. |
| 7,915,575 B2 | 3/2011 | Yokoi |
| 7,918,555 B2 | 4/2011 | Sverdrup et al. |
| 7,943,889 B2 | 5/2011 | Vogt |
| 7,957,057 B2 | 6/2011 | Sase et al. |
| 7,973,927 B2 | 7/2011 | Raicu et al. |
| 7,978,405 B2 | 7/2011 | Laudo |
| 7,978,894 B2 | 7/2011 | Soenksen |
| 7,986,456 B2 | 7/2011 | Frekers et al. |
| 8,049,873 B2 | 11/2011 | Hauger et al. |
| 8,055,042 B2 | 11/2011 | Soenksen |
| 8,085,402 B2 | 12/2011 | Ichimura et al. |
| 8,094,303 B2 | 1/2012 | Denney et al. |
| 8,094,902 B2 | 1/2012 | Crandall et al. |
| 8,115,164 B2 | 2/2012 | Netz et al. |
| 8,119,960 B2 | 2/2012 | Fukuyama |
| 8,139,288 B2 | 3/2012 | Osborne et al. |
| 8,159,744 B2 | 4/2012 | Tsurumune |
| 8,164,622 B2 | 4/2012 | Crandall |
| 8,175,452 B1 | 5/2012 | Staker et al. |
| 8,189,201 B2 | 5/2012 | Haisch et al. |
| 8,237,797 B2 | 8/2012 | Hayashi et al. |
| 8,238,387 B2 | 8/2012 | Yamazoe |
| 8,254,020 B2 | 8/2012 | Holy et al. |
| 8,254,023 B2 | 8/2012 | Watson et al. |
| 8,263,946 B2 | 9/2012 | Gugel |
| 8,275,226 B2 | 9/2012 | Berman |
| 8,284,483 B2 | 10/2012 | Beaurepaire et al. |
| 8,362,448 B2 | 1/2013 | Wolleschensky et al. |
| 8,368,035 B2 | 2/2013 | Seibel et al. |
| 8,384,901 B2 | 2/2013 | Yudakov et al. |
| 8,385,619 B2 | 2/2013 | Soenksen |
| 8,440,969 B2 | 5/2013 | Moore et al. |
| 8,441,633 B2 | 5/2013 | Truong et al. |
| 8,450,674 B2 | 5/2013 | Yang et al. |
| 8,456,725 B2 | 6/2013 | Toomre et al. |
| 8,526,091 B2 | 9/2013 | Ito et al. |
| 8,558,998 B2 | 10/2013 | Feldkhun et al. |
| 8,565,499 B2 | 10/2013 | Zhao et al. |
| 8,575,570 B2 | 11/2013 | Choi et al. |
| 8,643,924 B2 | 2/2014 | Okada |
| 8,654,441 B2 | 2/2014 | Jalali et al. |
| 8,711,211 B2 | 4/2014 | Betzig |
| 8,711,473 B2 | 4/2014 | Hirata |
| 8,743,195 B2 | 6/2014 | Najmabadi et al. |
| 8,755,579 B2 | 6/2014 | Soenksen |
| 8,759,745 B2 | 6/2014 | Klose et al. |
| 8,773,760 B2 | 7/2014 | Gmitro et al. |
| 8,786,693 B2 | 7/2014 | Kihara et al. |
| 8,792,156 B1 | 7/2014 | Kieu et al. |
| 8,830,573 B2 | 9/2014 | Cui et al. |
| 8,841,591 B2 | 9/2014 | Wilde et al. |
| 8,878,923 B2 | 11/2014 | Henderson et al. |
| 8,896,918 B2 | 11/2014 | Dixon |
| 8,908,270 B2 | 12/2014 | Murayama et al. |
| 8,948,846 B2 | 2/2015 | Pan |
| 8,958,148 B2 | 2/2015 | Honda |
| 8,964,020 B2 | 2/2015 | Hersee |

(56) References Cited

U.S. PATENT DOCUMENTS

| | | |
|---|---|---|
| 8,964,288 B2 | 2/2015 | Cooper |
| 8,965,196 B2 | 2/2015 | Staker et al. |
| 8,982,206 B2 | 3/2015 | Raicu et al. |
| 8,982,455 B2 | 3/2015 | Redford |
| 9,001,321 B2 | 4/2015 | Fujita et al. |
| 9,030,548 B2 | 5/2015 | Zhou et al. |
| 9,036,232 B2 | 5/2015 | Birk et al. |
| 9,041,793 B2 | 5/2015 | Bugge et al. |
| 9,057,879 B2 | 6/2015 | Knebel et al. |
| 9,063,335 B2 | 6/2015 | Sommer et al. |
| 9,081,173 B2 | 7/2015 | Vizi et al. |
| 9,091,861 B2 | 7/2015 | Kishimoto |
| 9,103,721 B2 | 8/2015 | Raicu et al. |
| 9,104,030 B2 | 8/2015 | Kieu et al. |
| 9,110,301 B2 | 8/2015 | Lippert et al. |
| 9,122,070 B2 | 9/2015 | Suzuki |
| 9,134,519 B2 | 9/2015 | Berman |
| 9,149,180 B2 | 10/2015 | Muto et al. |
| 9,153,928 B2 | 10/2015 | Fermann et al. |
| 9,170,151 B2 | 10/2015 | Kuwabara et al. |
| 9,201,008 B2 | 12/2015 | Thériault et al. |
| 9,201,231 B2 | 12/2015 | Honda |
| 9,223,125 B2 | 12/2015 | Betzig |
| 9,250,061 B2 | 2/2016 | Lorbeer et al. |
| 9,261,689 B2 | 2/2016 | Shimada et al. |
| 9,268,133 B2 | 2/2016 | Takahashi |
| 9,285,575 B2 | 3/2016 | Xie et al. |
| 9,304,308 B2 | 4/2016 | Goruganthu |
| 9,304,309 B2 | 4/2016 | Okada |
| 9,335,253 B2 | 5/2016 | Ode |
| 9,347,871 B2 | 5/2016 | Fujinuma et al. |
| 9,360,660 B2 | 6/2016 | Yi et al. |
| 9,383,565 B2 | 7/2016 | Shi et al. |
| 9,386,211 B2 | 7/2016 | Soenksen |
| 9,404,857 B2 | 8/2016 | Popescu et al. |
| 9,429,740 B2 | 8/2016 | Winterot et al. |
| 9,448,395 B2 | 9/2016 | Betzig |
| 9,464,995 B2 | 10/2016 | Edelmann et al. |
| 9,477,074 B2 | 10/2016 | Betzig |
| 9,478,393 B2 | 10/2016 | Potocek et al. |
| 9,494,777 B2 | 11/2016 | Rumyantsev et al. |
| 9,507,136 B2 | 11/2016 | Cooper et al. |
| 9,509,956 B2 | 11/2016 | Piestun et al. |
| 9,519,127 B2 | 12/2016 | Matsumoto et al. |
| 9,541,750 B2 | 1/2017 | Bouzid |
| 9,551,568 B2 | 1/2017 | Zhou et al. |
| 9,551,862 B2 | 1/2017 | Mizuta |
| 9,563,046 B2 | 2/2017 | Hohng et al. |
| 9,564,291 B1 | 2/2017 | Own et al. |
| 9,581,497 B2 | 2/2017 | Mikami |
| 9,594,237 B2 | 3/2017 | Schwedt et al. |
| 9,625,694 B2 | 4/2017 | Dohi |
| 9,625,696 B2 | 4/2017 | Hashimoto et al. |
| 9,632,301 B2 | 4/2017 | Damaskinos et al. |
| 9,634,454 B1 | 4/2017 | Kieu et al. |
| 9,645,376 B1 | 5/2017 | Fischer et al. |
| 9,645,378 B2 | 5/2017 | Hilbert et al. |
| 9,645,380 B2 | 5/2017 | Wartmann |
| 9,690,974 B2 | 6/2017 | Obrien et al. |
| 9,696,531 B2 | 7/2017 | Hersee |
| 9,696,532 B2 | 7/2017 | Kitagawa |
| 9,696,536 B2 | 7/2017 | Nobis |
| 9,709,786 B2 | 7/2017 | Fukutake |
| 9,709,789 B2 | 7/2017 | Dam et al. |
| 9,720,218 B2 | 8/2017 | Cui et al. |
| 9,721,326 B2 | 8/2017 | Piché et al. |
| 9,726,878 B2 | 8/2017 | Krattiger |
| 9,915,519 B2 | 3/2018 | Wu et al. |
| 9,939,243 B2 | 4/2018 | Brotman |
| 2001/0015411 A1 | 8/2001 | Ohdaira et al. |
| 2002/0018291 A1 | 2/2002 | Fukuyama |
| 2002/0159146 A1 | 10/2002 | Leimbach et al. |
| 2002/0176076 A1 | 11/2002 | Bouzid et al. |
| 2003/0058530 A1 | 3/2003 | Kawano |
| 2003/0214707 A1 | 11/2003 | Engelhardt |
| 2004/0051030 A1 | 3/2004 | Olszak et al. |
| 2004/0080818 A1 | 4/2004 | Olschewski |
| 2004/0115683 A1 | 6/2004 | Medford et al. |
| 2004/0133112 A1 | 7/2004 | Rajadhyaksha |
| 2004/0218263 A1 | 11/2004 | Brugal |
| 2004/0238730 A1 | 12/2004 | Langowski et al. |
| 2005/0024718 A1 | 2/2005 | Sase et al. |
| 2005/0058372 A1 | 3/2005 | Engelmann et al. |
| 2005/0072913 A1 | 4/2005 | Lange et al. |
| 2005/0078362 A1 | 4/2005 | Borlinghaus |
| 2005/0099682 A1 | 5/2005 | Lauer |
| 2005/0207005 A1 | 9/2005 | Kawano |
| 2006/0011812 A1 | 1/2006 | Wolleschensky et al. |
| 2006/0012864 A1 | 1/2006 | Funk et al. |
| 2006/0012891 A1 | 1/2006 | Goelles et al. |
| 2006/0018013 A1 | 1/2006 | Suzuki et al. |
| 2007/0047071 A1 | 3/2007 | Honda et al. |
| 2007/0081222 A1 | 4/2007 | Bartzke et al. |
| 2007/0109633 A1 | 5/2007 | Stelzer |
| 2007/0121198 A1 | 5/2007 | Suzuki et al. |
| 2007/0121200 A1 | 5/2007 | Suzuki et al. |
| 2007/0121473 A1 | 5/2007 | Lange et al. |
| 2007/0159689 A1 | 7/2007 | Schau et al. |
| 2007/0171433 A1 | 7/2007 | Tearney et al. |
| 2007/0183029 A1 | 8/2007 | Iketaki |
| 2007/0238955 A1 | 10/2007 | Tearney et al. |
| 2007/0246659 A1 | 10/2007 | Bloos et al. |
| 2008/0013166 A1 | 1/2008 | Haisch et al. |
| 2008/0158668 A1 | 7/2008 | Ouchi et al. |
| 2008/0180790 A1 | 7/2008 | Tafas et al. |
| 2008/0204766 A1 | 8/2008 | Uhl |
| 2009/0174935 A1 | 7/2009 | Szulczewski et al. |
| 2009/0303584 A1 | 12/2009 | Pacholik et al. |
| 2010/0014156 A1 | 1/2010 | Iketaki |
| 2010/0053743 A1 | 3/2010 | Galimberti et al. |
| 2010/0265575 A1 | 10/2010 | Lippert et al. |
| 2011/0025837 A1 | 2/2011 | Vossen et al. |
| 2011/0122488 A1 | 5/2011 | Truong et al. |
| 2011/0134254 A1 | 6/2011 | Hulsken et al. |
| 2011/0194174 A1 | 8/2011 | Laudo |
| 2011/0216401 A1 | 9/2011 | Curry |
| 2012/0050733 A1 | 3/2012 | Takimoto |
| 2012/0206798 A1 | 8/2012 | Knop et al. |
| 2012/0287244 A1 | 11/2012 | Bennett et al. |
| 2012/0320438 A1 | 12/2012 | Knebel et al. |
| 2013/0057953 A1 | 3/2013 | Yokoi |
| 2013/0229663 A1 | 9/2013 | Yang et al. |
| 2013/0286181 A1 | 10/2013 | Betzig et al. |
| 2014/0099659 A1 | 4/2014 | Keller |
| 2014/0118529 A1 | 5/2014 | Zheng et al. |
| 2014/0126046 A1 | 5/2014 | Shroff et al. |
| 2014/0192406 A1 | 7/2014 | Bathe |
| 2015/0098126 A1* | 4/2015 | Keller ............... G02B 21/0076 359/385 |
| 2015/0116822 A1 | 4/2015 | Mori |
| 2015/0253560 A1 | 9/2015 | Otte et al. |
| 2015/0286042 A1 | 10/2015 | Hilbert et al. |
| 2015/0338625 A1 | 11/2015 | Sieckmann et al. |
| 2015/0370060 A1 | 12/2015 | Williams et al. |
| 2016/0041200 A1 | 2/2016 | Fine |
| 2016/0048014 A1 | 2/2016 | Knebel et al. |
| 2016/0054226 A1 | 2/2016 | Gandolfi et al. |
| 2016/0103318 A1 | 4/2016 | Du et al. |
| 2016/0123812 A1 | 5/2016 | Kyogaku |
| 2016/0123813 A1 | 5/2016 | Kyogaku |
| 2016/0139387 A1 | 5/2016 | Virk et al. |
| 2016/0139394 A1 | 5/2016 | Taniguchi et al. |
| 2016/0154236 A1 | 6/2016 | Siebenmorgen et al. |
| 2016/0170193 A1 | 6/2016 | Ue |
| 2016/0195705 A1 | 7/2016 | Betzig et al. |
| 2016/0209588 A1 | 7/2016 | Steinert et al. |
| 2016/0209646 A1 | 7/2016 | Hattori et al. |
| 2016/0220120 A1 | 8/2016 | Kim et al. |
| 2016/0259163 A1 | 9/2016 | Hoegele et al. |
| 2016/0282596 A1 | 9/2016 | Ciobota et al. |
| 2016/0299326 A1 | 10/2016 | Eggert et al. |
| 2016/0341668 A1 | 11/2016 | Gupta et al. |
| 2016/0363538 A1 | 12/2016 | Dutertre et al. |
| 2016/0363563 A1 | 12/2016 | Fukushima |

(56) References Cited

U.S. PATENT DOCUMENTS

| | | |
|---|---|---|
| 2016/0370570 A1 | 12/2016 | Foelling |
| 2017/0038291 A1 | 2/2017 | Chen |
| 2017/0038575 A1 | 2/2017 | Pretorius |
| 2017/0059840 A1 | 3/2017 | Tamano |
| 2017/0059841 A1 | 3/2017 | Trulson et al. |
| 2017/0168280 A1 | 6/2017 | Schumann et al. |
| 2017/0184830 A1 | 6/2017 | Akahane |
| 2017/0199362 A1 | 7/2017 | Schwedt et al. |
| 2017/0219809 A1 | 8/2017 | Wald et al. |
| 2017/0254749 A1 | 9/2017 | Yun |
| 2017/0261736 A1 | 9/2017 | Abe |
| 2017/0285315 A1 | 10/2017 | Amano et al. |
| 2017/0299553 A1 | 10/2017 | Fukushima et al. |
| 2017/0301101 A1 | 10/2017 | Stoppe et al. |
| 2017/0307864 A1 | 10/2017 | Daugela |
| 2017/0315339 A1 | 11/2017 | Schwedt et al. |
| 2017/0322408 A1 | 11/2017 | Iguchi |
| 2017/0350763 A1 | 12/2017 | Shafer et al. |
| 2017/0351111 A1 | 12/2017 | Jeong et al. |
| 2017/0356884 A1 | 12/2017 | Hu et al. |
| 2018/0031816 A1 | 2/2018 | Shimada |
| 2018/0039059 A1 | 2/2018 | Kondo et al. |
| 2018/0120550 A1 | 5/2018 | Boccara et al. |
| 2018/0125360 A1 | 5/2018 | Högele et al. |
| 2018/0136451 A1 | 5/2018 | Soenksen |
| 2018/0149673 A1 | 5/2018 | Huo et al. |
| 2018/0195963 A1 | 7/2018 | Imoto |
| 2018/0196246 A1 | 7/2018 | Bares et al. |
| 2018/0210184 A1 | 7/2018 | Betzig |
| 2018/0231416 A1 | 8/2018 | Roscher et al. |
| 2019/0064493 A1 | 2/2019 | Truong et al. |

FOREIGN PATENT DOCUMENTS

| | | |
|---|---|---|
| WO | 2015109323 A2 | 7/2015 |
| WO | 2015184124 A1 | 12/2015 |
| WO | 2019161048 A1 | 8/2019 |

OTHER PUBLICATIONS

Bouchard et al., "Swept confocally-aligned planar excitation (SCAPE) microscopy for high-speed volumetric maging of behaving organisms", Nature Photonics, Jan. 19, 2015, vol. 9(2), pp. 113-119.

Chhetri et al., "Whole-animal functional and developmental imaging with isotropic spatial resolution", Nature Methods, Dec. 2015, vol. 12(12), pp. 1171-1178.

Holy, "Calcium imaging in populations of olfactory neurons by planar illumination microscopy", Cold Spring Harb Protoc, Mar. 1, 2014, 2014(3), pp. 317-323.

International Search Report and Written Opinion for International Application No. PCT/US2017/061165 dated Mar. 9, 2018.

Tomer et al., "Advanced CLARITY for rapid and high-resolution imaging of intact tissues", Nat Protoc, Jul. 2014, vol. 9(7): pp. 1682-1697.

Tomer, "Shedding light on the system: studying embryonic development with light sheet microscopy", Curr Opin Genet Dev, Oct. 2011, 21(5), pp. 558-565.

Vettenburg et al., "Light-sheet microscopy using an Airy beam", Nature Methods, May 2014, vol. 11(5), pp. 541-544.

Wu et al., "Inverted selective plane illumination microscopy (iSPIM) enables coupled cell identity lineaging and Teurodevelopmental imaging in Caenorhabditis elegans", Proceedings of the National Academy of Sciences, Oct. 25, 2011, vol. 108(43), pp. 17708-17713.

Wu et al., "Spatially isotropic four-dimensional imaging with dual-view plane illumination microscopy", Nat Biotechnol, Nov. 2013, 31(11), pp. 1032-1038.

Extended European Search Report dated May 18, 2020 for European Patent Application No. 17868760.4.

Hedde et al., "Selective plane illumination microscopy with a light sheet of uniform thickness formed by an electrically tunable lens," Microscopy Research and Technique, vol. 81(9), Sep. 2018, pp. 924-928.

* cited by examiner

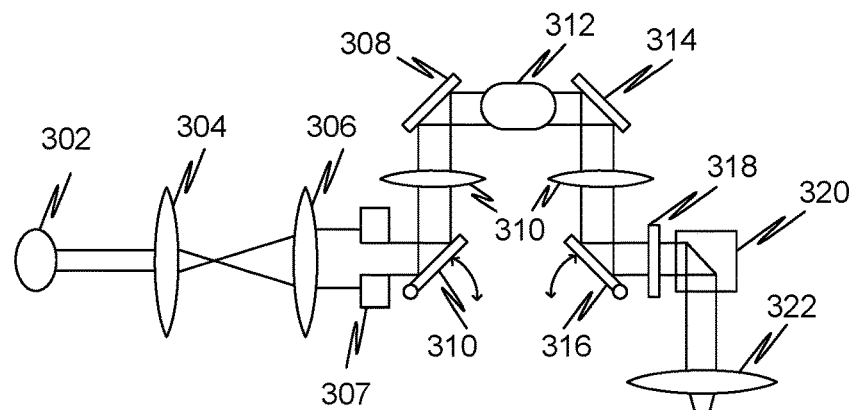
Fig. 5B
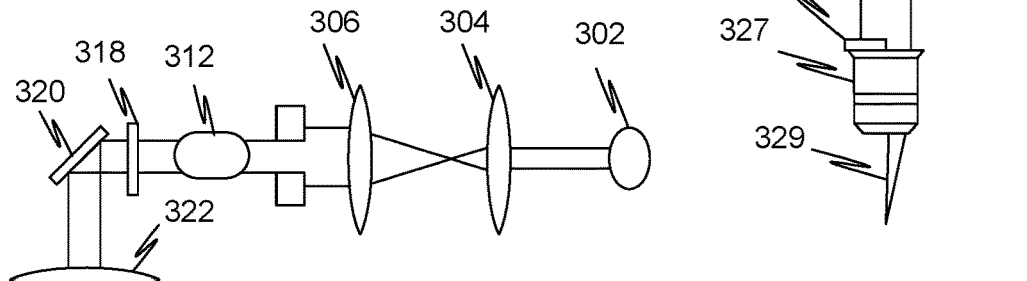
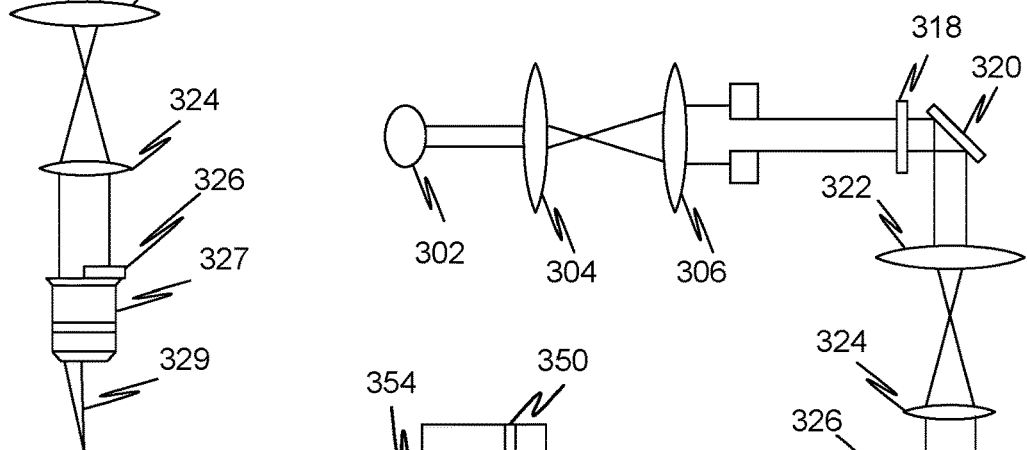
Fig. 5C
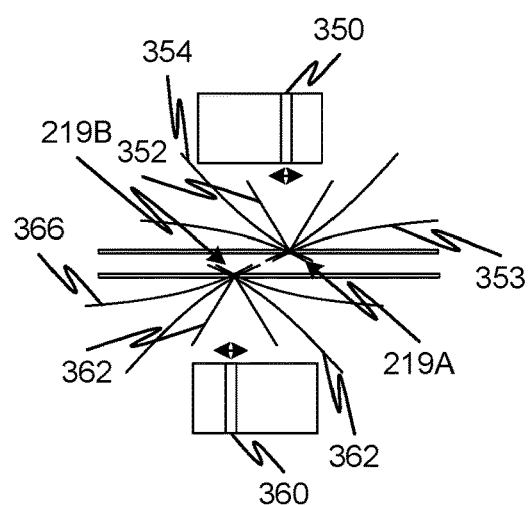
Fig. 5D
Fig. 6

LSTM single plane

LSTM single image stack

LSM single plane

LSM single image stack

IMAGING INSTRUMENT HAVING OBJECTIVE AXIS AND LIGHT SHEET OR LIGHT BEAM PROJECTOR AXIS INTERSECTING AT LESS THAN 90 DEGREES

CROSS REFERENCE TO RELATED APPLICATIONS

This Application is a US national stage filing under 35 U.S.C. § 371 of International Application No. PCT/US2017/061165, filed Nov. 10, 2017, which claims the benefit of U.S. Provisional Application 62/420,349 filed Nov. 10, 2016, and U.S. Provisional Application 62/473,944, filed Mar. 20, 2017, each of which is incorporated herein by reference in its entirety.

BACKGROUND

There is an increasing need for methods and devices that permit rapid high-resolution imaging of the structure and function of large three-dimensional objects, for example broad slabs of substantial thickness, in particular, fully intact biological samples such as large slices of biological tissues. An example of this is brain tissues the importance of which, to neuroscience research is underscored by the announcement of high profile initiative including White House sponsored BRAIN Initiative for building Neurotechnologies.

In the known technique of light sheet microscopy (LSM), a thin sheet of light illuminates a sample from the side and an orthogonally arranged objective detects the emitted signal from the illuminated plane. FIG. 1A is a figurative illustration of a light sheet microscope. A detection optical system 100 has a camera 110 that receives image light signal through an imaging lens 108 and an objective 104 having a high numerical aperture (NA) for discriminating feature in a relatively thick sample 115. The sample 115 is illuminated by light sheets 114 and 112 which are projected from illumination objectives 102 and 106 into the sample so as to focus a pair of light sheets 114 and 112 on the front focal plane of the imaging system. Three dimensional volumes of samples are acquired by either moving the sample 115 step-wise to image it plane-by-plane or by synchronously moving the aligned light-sheet and detection objective step-wise through the stationary sample. The acquired image "stack" (i.e., the collection of 2D planes) provides three-dimensional information about the sample. Samples larger than the field-of-view of the microscope (i.e. the part of sample visible at one position) are imaged by acquiring tiles of stacks which are then stitched together. Such volumes can also be acquired repeatedly with time delays to allow capturing of the dynamics of living samples.

The configuration of light sheet microscopy provides two key advantages: minimum possible energy load on the sample (therefore minimum photobleaching and phototoxicity) and very high imaging speeds. The imaging depth (i.e., the sample dimension along the imaging axis) is generally determined by the working distance of the detection objective, which puts a physical limit, and the optical scattering properties of biological tissue being imaged. The overall intact sample size that can be imaged is also restricted in one of the two other sample dimensions (i.e., the dimension along the light sheet propagation direction indicated in FIG. 1A at 117 and labeled "limit on sample size") as the light-sheet needs to penetrate the tissue for illumination.

A commonly used configuration (FIG. 1B) that can address these limitations provides a detection objective 130 and illumination objective 130 whose optical axes are at 45 degrees to sample surface normal. This configuration reduces the imaging depth in the sample as the effective working distance of the detection objective is limited because of the angle. Also because of the geometry constraints of physical size of detection objective 130 (i.e. the objective may physically ram into the sample). The working distance is adversely affected as indicated by the arrowheads. In addition, using an angled detection objective results in aberrations, especially for high resolution detection objectives. Light sheets can also be generated through the detection objective itself (i.e. using of same objective for illumination and detection), as in oblique plane microscopy for example described by Dunsby in US Patent Publication 8582203. This however comes at the cost of reduction in the image quality, imaging depth (as the signal is detected off the native imaging plane) and also high photo damage.

SUMMARY

Presently described are embodiments of a microscope which may be identified as Light Sheet Theta Microscopy (LSTM), also referred to herein as LSTM. The LSTM microscope provides the ability to resolve images in substantial depth as in a light sheet microscopy while providing the ability to scan samples having a large area. Variations also provide faster scanning by imaging on opposite sides of the sample.

Objects and advantages of embodiments of the disclosed subject matter will become apparent from the following description when considered in conjunction with the accompanying drawings.

BRIEF DESCRIPTION OF DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

FIGS. 5B through 5D illustrate optional illumination arms that employ various optical components for providing various features, according to embodiments of the disclosed subject matter.

FIG. 6 illustrates the simultaneous acquisition of illuminated linear regions in separate planes at independent coordinates of the axis that is perpendicular to the illuminated line and parallel to the sample surface, according to embodiments of the disclosed subject matter.

DETAILED DESCRIPTION

Presently described are embodiments of a microscope which may be identified as Light Sheet Theta (LS-θ) Microscopy, also referred to herein as LSTM. LSTM achieves planar imaging by employing obliquely arranged illumination light sheets from the same side of the sample as the detection objective. This configuration alleviates limitations on the lateral dimensions of the sample, while providing similar or better imaging depth, quality, low photobleaching and high imaging speed for larger samples. LSTM allows imaging of larger samples with high uniform resolution across the entire sample. In addition, LSTM achieves uniform illumination across the entire imaging field-of-view, in contrast to the non-uniform Gaussian illumination commonly used in LSM, thus enabling quantitative imaging across the entire sample. LSTM allows imaging of large samples including thick slabs of cleared and labelled post-mortem healthy and diseased human brains as well as imaging of large animal intact brains, including rat and primate brains. Moreover, LSTM facilitates in situ detection of thousands of transcripts in expanded tissue samples.

Figure 1A:
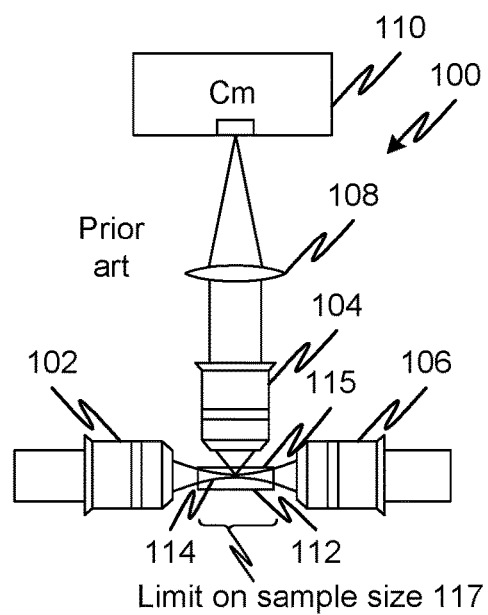
FIGS. 1A and 1B illustrate embodiments of prior art light sheet type microscopes.
Figure 1B:
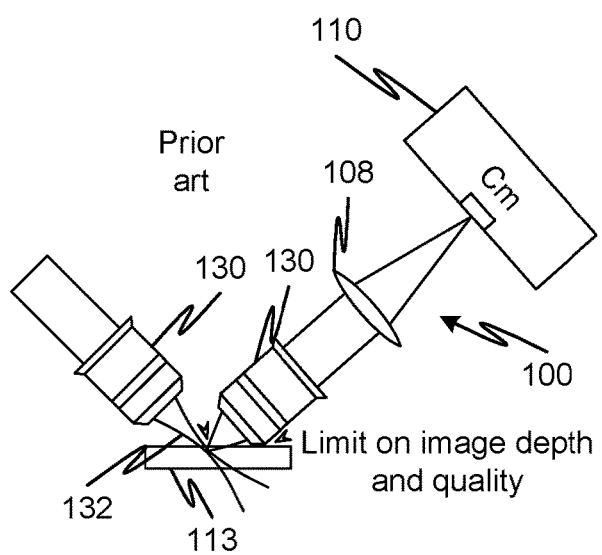
Figure 2:
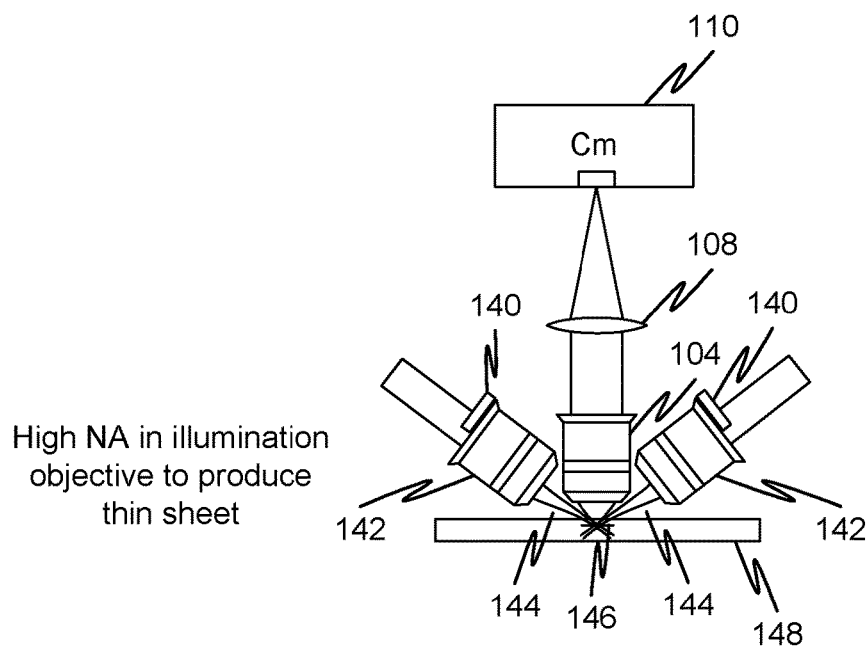
FIG. 2 illustrates specific features of LSTM, according to embodiments of the disclosed subject matter.

An embodiment is illustrated figuratively in FIG. 2, Illumination beam is formed through illumination objectives 142 in combination with preceding optics which form a sheet of light 144. The preceding optics may include scanning mirrors and electrically tunable lenses for scanning, sheet formation optical elements that may include a cylindrical lens, and a partial block 140 the combined effect of which are to form the light sheets 144 in desired positions traversing across and along each respective optical axis. Note that the effect of the block 140 is to form the light sheet such that it is not blocked by the detection objective. By forming the light sheet through a side of the illumination objective, the light sheet has a central axis that is oblique to the illumination objectives optical axis and is closer to parallel with the sample surface plane and further from the surface normal. This configuration may place the angle of the light sheet (or sheets) between the angles of the light sheets in the prior embodiments FIGS. 1A and 1B.

To provide the ability to scan large samples as in large sample imaging capabilities without affecting the imaging depth or the image quality. The optical layout is summarized in FIG. 2. The basic idea is to place the detection objective normal to the sample surface, while placing the illumination objectives that generate light sheets at an angle (theta) significantly smaller than 90 degrees. In this configuration, the light sheet enters from same side of the sample as the detection objective. The formed light sheets are arranged at an angle relative to the detection plane. The intersection of the light-sheet and the detection focal plane results in an illuminated linear volume discriminated by the detection arm that appears end-on at 219 in FIG. 3A.

Figure 3A:
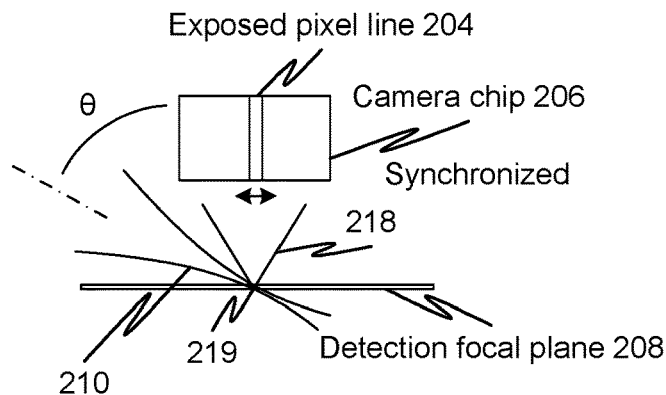
FIG. 3A illustrates a LSTM microscope that employs a single light sheet illuminating a single linear region, according to embodiments of the disclosed subject matter.
Figure 3D:
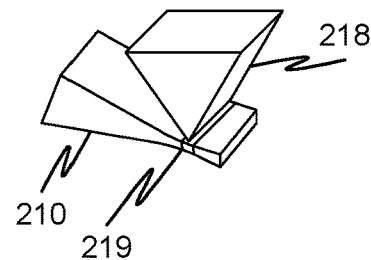
FIG. 3D illustrates the volume of the sample that is discriminated by the detection arm in combination with the focus, the selection of pixels of the imaging device, and the light sheet intersection with the focal plane, according to embodiments of the disclosed subject matter.

Referring momentarily to FIG. 3D, the illuminated linear volume 219 is actually a small volume that is discriminated through not only the high NA detection objective (and other detection optics) which define the front focal plane but also the selection of pixels on the sCMOS camera 110 sensor which exclude out-of-plane light in a manner similar to a slit and also exclude light that is adjacent to the linear volume 219 that is targeted. This detected line 219 can be selected using illumination scanning optics that move the line 219 by moving the region where the light sheet intersects the front focal plane while simultaneously selecting the portion (i.e., the elongate region of pixels) on the sCMOS (or any other scientific camera) camera sensor that are detected. Call this line-by-line detection. This effectively scans the detection optics simultaneously with the illumination optics. That is, the syncing of line-by-line detection of sCMOS camera with the line illumination ensures that only the signal from that particular illuminated linear volume 219 is detected and interference from other sources of scattering or illumination are rejected.

By scanning this illuminated linear volume 219, the entire front focal plane may be illuminated and captured. The scanning on the illumination side may be performed, as later explained, by one or more mirrors, electrically tunable lenses, or alternatives thereto (e.g., rotating prisms, diffraction optics, MEMs pico projectors, electrically controllable spatial light modulators, tunable Acoustic lens (e.g. TAG Lens) and others commended by the state of the art for this purpose. This can also be achieved by synchronously scanning the illumination objective along the light sheet propagation direction alternatively or in conjunction with other scanning mechanisms.). The scanning of the light sheet in combination with the selective sampling of lines on the sCMOS camera imaging plane together may capture a "tile" portion of a larger sample to be imaged in its entirety. By syncing the illuminated linear volume 219 with the line-by-line detection of the sCMOS camera 110, high quality images of the plane are acquired.

According to embodiments, three different modes of detection may be provided with respective embodiments or through a single embodiment with multiple user-selectable modes. Referring to FIG. 3A, in a first mode, a single light sheet 210 is used to generate an illuminated linear volume 219. An exposed pixel line 204 is illustrated schematically to show that it corresponds to a column of pixels (or multiple columns or numerical synthesis of the signals from multiple columns effective to provide the selection of desired optical signal and exclusion of undesired such as scattered light from regions outside the illuminated linear volume 219). The cone of light captured and imaged from the illuminated linear volume 219 is indicated at 218 to indicate a high NA detection objective.

Figure 3B:
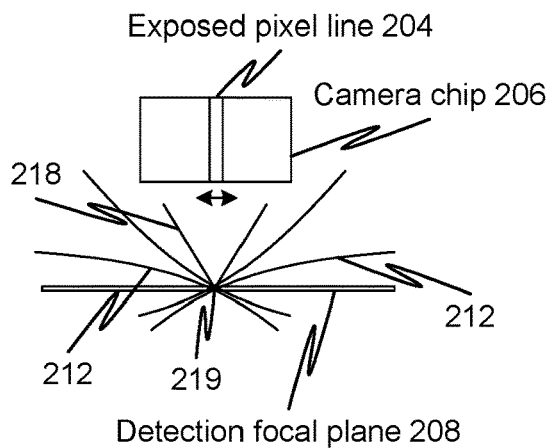
FIG. 3B illustrates LSTM that employ double light sheets illuminating a single linear region, according to embodiments of the disclosed subject matter.
Figure 3C:
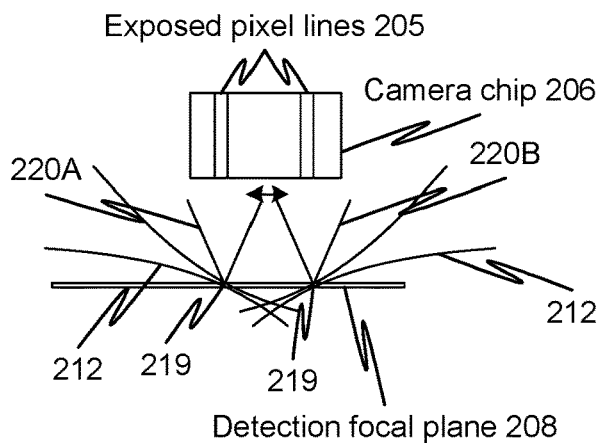
FIG. 3C illustrates LSTM microscope that employ double light sheets illuminating respective linear regions, embodiments of the disclosed subject matter.

A second mode is as that illustrated in FIG. 2 and further described by FIG. 3B where a single illuminated linear volume 219 is generated by a single detection arm and dual light sheets 212. A third embodiment shown in FIG. 3C provides two light sheets 212, one on each side of the detection objective. The two light sheets may independently scan two different portions, for example two halves, of the plane as illustrated by the two image light cones 220A and 220B. (Note, that for detection of a light sheet, the term "wedge" may be more appropriate than "cone", but it should be clear from context when is being identified by the latter term). As indicated above, the scanning may be done with the sample and the detection and illumination arms in respective fixed positions while the light scanning optics provide motion of the illuminated linear volume 219 and, simultaneously, the exposed pixel lines 205 are selected by sampling of the image plane of the camera chip 206. Note that in the figure the left pixel line 205 may correspond to the right light cone 220B and the right pixel line 205 may correspond to the left light cone 220A if the detection optics flips the image about the optical axis.

Figure 4A:
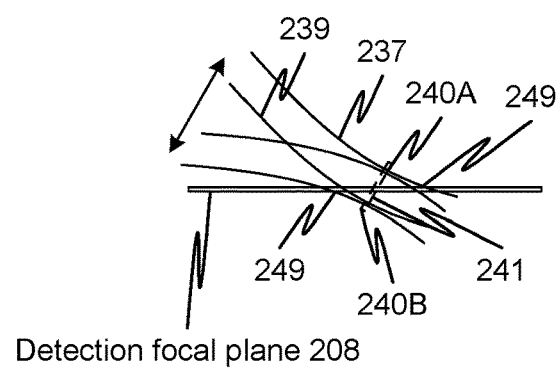
FIGS. 4A and 4B show scanning modes, including a first 4A that scans a light sheet in a single axis perpendicular to an oblique (with respect to the sample surface) optical axis and a second 4B that scans a light sheet in dual axes both oblique and parallel to the sample surface, according to embodiments of the disclosed subject matter.

Other variant scanning modes are possible for each of the foregoing modes. For example, there are two scanning modes for scanning the illuminated linear volume 219 for planar illumination. Referring to FIG. 4A, a first of these scanning modes is where the light sheet is only displaced laterally (i.e. perpendicular to the light sheet propagation direction) as indicated by laterally displaced light sheets 237 and 239 which defined illuminated linear volumes 240A and 240B (these are positions along a front focal plane of the light sheet (beam waist) that traverses the plane indicated at 241. The latter may be accomplished using a galvo mirror, for example. In this scanning mode, referred to herein as 1-axis scanning (1-AS), the intersection of the light sheet and focal plane happens at different position in the light sheet.

Figure 4B:
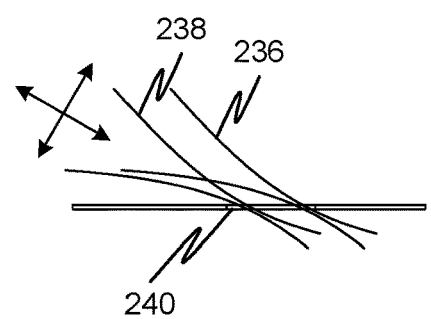

Referring to FIG. 4B, in a second scanning mode, referred to herein as 2-axes scanning (2-AS), the front focal plane of the illumination optics is translated axially as well as transversely. By permitting the focused position of light sheet (i.e. the beam waist) to be scanned along the light sheet propagation direction as well as transversely, particularly in synchrony with the lateral scanning (as in the first mode) so that the thinnest part of the light sheet intersects with the detection plane, the front focal plane of the illumination optics can intersect with the detection front focal plane, resulting in very high image quality. In the latter mode, high-NA illumination objectives, results in much thinner light sheets.

To characterize and compare these modes of illumination and detection, micron scale fluorescent beads and CLARITY-cleared human brain tissue stained with nuclear stain DAPI were imaged. The resulting image volumes revealed that 2-AS allows for much more uniform axial resolution across the entire field-of-view, whereas both 1-AS and conventional LSM imaging produce reduced image quality on the periphery of the field-of-view. Simultaneous two-sided illumination from two symmetrically arranged illumination arms (as seen in FIG. 3B), provided higher signal and reduces the illumination artifacts caused by opaque objects in the illumination path thus improving the uniform planar illumination and detection prerequisite for achieving quantitatively accurate imaging.

The three-dimensional volumes are acquired by either moving the sample across the illuminated sheet in a stepwise manner (or continuously at slow speed, while imaging), or by synchronously moving the effective illumination light-sheet and the exposed pixel line resolved by the detection arm. Imaging speed can be further increased by simultaneously imaging the sample from opposed detection arms on respective opposite faces of the sample. In addition, a continuous motion of the sample may be used to traverse laterally instead of moving the exposed pixel line. The continuous traversal is faster than step-wise motion as linear stages may take significant amount of time for starting and stopping.

The various LSTM system embodiments enable imaging experiments of large sample size with extremely high resolution similar that of light sheet microscopy. In LSTM microscopy the detection objective remains normal to the sample surface, and the illumination objectives are placed at an angle (significantly different from 90 degrees, as close to 90 degrees as allowed by the geometry), thus removing the limitations demonstrated in FIGS. 1A and 1B. The light-sheet intersects with the detection plane of the objective in a line profile, which is then scanned horizontally to create an effective planar illumination upon integration. The synchronization of the line profile and the line-by-line detection of the sCMOS camera results in rejection of any signal other than the line profile. There are three modes that include use of one light-sheet and the modes of using of two light-sheets described above. Also, embodiments permit the use of two sheets independently to simultaneously image the two halves of the plane (resulting in 2 times higher imaging speed.) There are two methods to generate intersected illumination profiles. One where the light-sheet is only displaced laterally FIG. 4A (i.e. perpendicular to its propagation direction) and one where the light-sheet is also displaced axially (i.e. along the direction of propagation, which in combination with lateral displacements allows the generation of much thinner light sheets).

Some application examples include:

Imaging of thick slabs of human brain, or other organs, that are cleared by using any of the tissue clearing procedures including CLARITY, iDISCO, uDISCO, SeeDB, ClearT and Scale. These procedures employ a cocktail of chemicals to render the tissue transparent while preserving structural and molecular content. These tissues can come from normal or diseased states including, but not limited to, various types of cancers, neurological disorders and other diseased biopsies.

Imaging of large animal intact brains, including rat and primate brains. The current state-of-the-art technology has been limited to imaging samples of mouse brain size.

Live imaging applications in imaging mouse brain for functional activity.

Live imaging of 3D cell cultures.

Figure 5A:
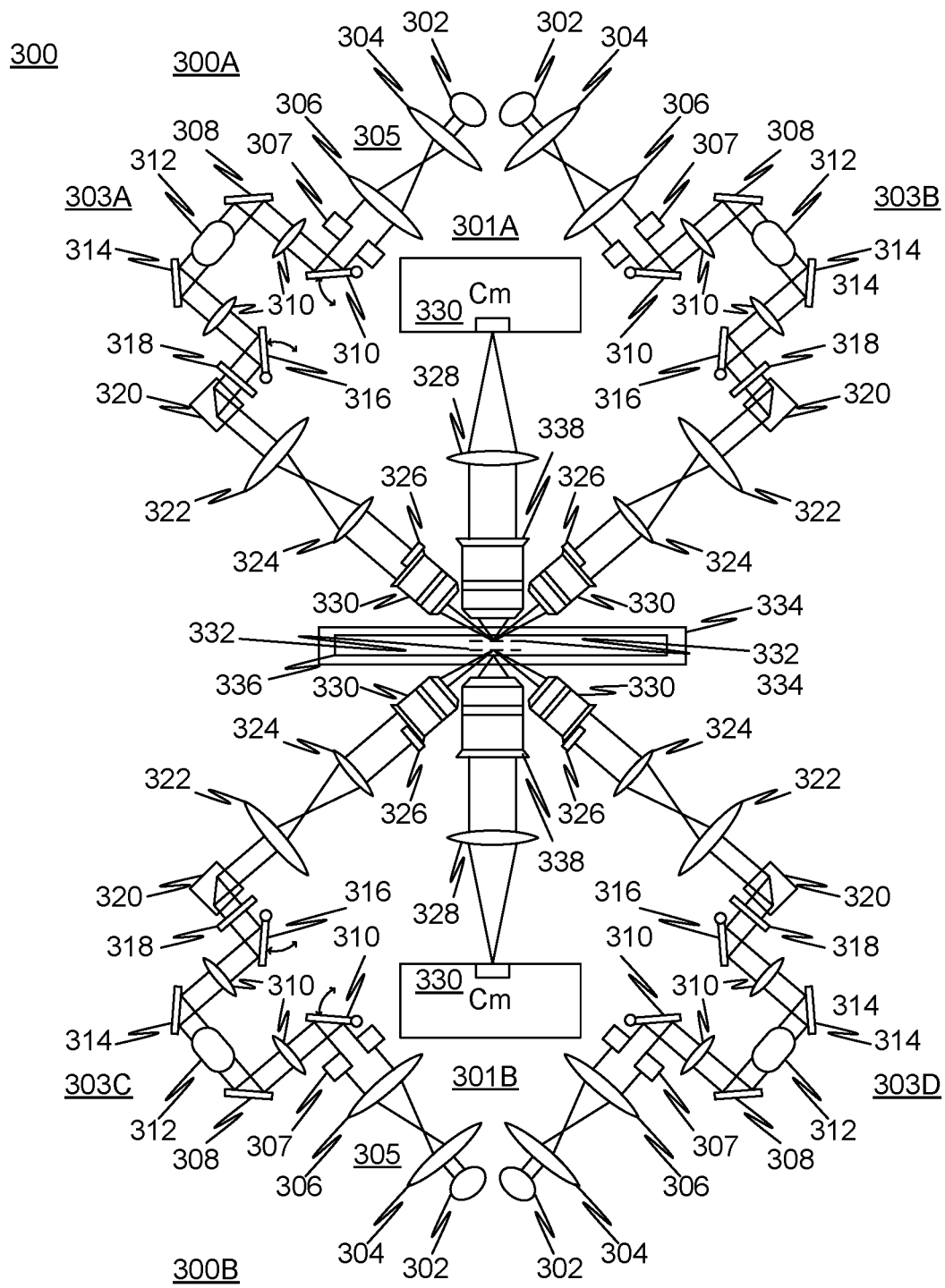
FIG. 5A shows a LSTM microscope for illustrating various features of the disclosed subject matter.

Referring to FIGS. 5A and 5B, an LSTM system configured to image two sides of a slab simultaneously has four illumination arms 303A, 303B, 303C, 303D. A single illumination arm of the current embodiment is shown in FIG. 5B at a larger size. In each illumination arm 303A, 303B, 303C, 303D, a light source 302 applies an input LASER whose diameter is expanded by a beam expander (BE) represented by the pair of lenses 304 and 306. An iris 307 remove the low-intensity peripheral parts of the expanded beams. The beam can be selectively diverted using a pair of flipping mirrors 310 and 316 or permitted to pass directly to a cylindrical lens 318. When the beam passes through the cylindrical lens 318, it is compressed in one dimension to generate a sheet-shaped profile. Thereafter, the beam is scanned by an optical scanning device 320, for example a one or two dimensional galvo mirror scanner. A first dimension of the scanner may scan the emerging sheet beam in a path that is generally perpendicular to the plane of the sheet and the second dimension, if present, may provide a degree of freedom for alignment. The focused sheet is then imaged on the sample via a scan lens 322 (f-theta lens which converts angular motion of Galvos to lateral motion), a tube lens 324 and the illumination objective 330, the stop 326 serving the function previously described with reference to block 140 of FIG. 2. When the flipping mirrors, which may be motorized, are in the divert position, the beam is reflected and routed through a U-shaped path by mirrors 308, 314 and a relay lens system 310. An electrically tunable lens (ETL) 312 can be controlled electrically at high speed to allow axial displacements described in FIG. 1E. The ETL is placed in at the conjugate focal plane by using the lens relay lens system 210. This selectable routing may be controlled by motorized flip mirrors 310, 316. The optical scanning device 320 allows fast lateral displacements of the final sheets as shown in FIGS. 4A and 4B. The detection arm includes the components described above with regard to FIG. 2, including detection objective 338, a tube lens 328 and sCMOS camera 330.

Note that instead of subsystems 300A and 300B being positioned to scan different layers of the sample, they may image the same layer simultaneously, permitting the captured image data to be combined to increase resolution. Variations may also be provided such as illumination arm or arms on one side and detection arm on the opposite side of the sample. Also, the block 140 may be eliminated and also made movable so that it can be adjusted from a range of 0% blockage to a major fraction of the aperture of the illumination objective. Any of the claimed embodiments may be modified to provide additional embodiments with zero or adjustable blockage.

It will be clear that any of the mirror or other deflectors such as optical scanning device 320 may be substituted by equivalent light redirectors. Such may include refracting as well as reflecting components or other types of light manipulation devices. Lenses may be of any suitable type. Waveguide-based devices including fiber optics may also be substituted for beam reflectors. Devices other than ETLs may be employed to manipulate the axial position of the front focal plane of the illumination arm, including but not limited to, mounting of illumination objective on fast piezo motors for axial motion profile. The camera 330 may also be replaced, for example by a scannable line sensor. Instead of a sheet beam, a scanned pencil beam may be projected over a target illuminated linear volume 219 although such alternatives may have characteristics that are adverse to the functions of speed provided by the illustrated and described embodiments.

A sample 336 may be mounted for translation and rotation movement, for example, mounted on an XYZ-theta motorized stage. This may permit the sample 336 to be scanned over multiple tiles. The illumination arm of FIG. 5B is replicated four times as shown in FIG. 5A. This allows multiple modes of illumination and image detection. FIG. 5A shows an LSTM system 300 with two identical LSTM subsystems 300A and 300B. Each LSTM subsystem has a respective detection arm 301A and 301B, one directed for detection at each face of the sample 336. Each detection arm 301A, 301B has a pair of illumination arms, detection arm 301A having illumination arms 303A and 303B and detection arm 301B having illumination arms 303C and 303D. The sample 336 may be surrounded by immersion liquid according to any relevant techniques. The four LSTM subsystems may scan at each of multiple discrete tile-specific positions of the translation system. Each scan images a layer, indicated at 332. The layer for each tile may be composited by stitching to form a full layer of the sample. In addition, the acquisition of multiple layers may be done for each tile, each layer being composited by stitching, to form a full layer. That is each tile-specific position of the translation system may acquire multiple layers.

FIGS. 5C and 5D show other variations of illumination arms that may be substituted for the illumination arms of FIG. 5A. FIG. 5C shows the illumination arm of FIG. 5B without the U-shaped diverted path, flipping mirrors and relay lens components. This provides the scanning functionality described relative to FIG. 5A but without the flexibility of switching the ETL in and out of the illumination arm. FIG. 5D shows an illumination arm suitable for the scanning mode depicted in FIG. 4A without the axial displacement of the light sheet front focal plane 241. The illumination arm of FIG. 5D has not ETL in the light path.

Referring to FIG. 6, a de-synchronized line- by-line detection mode for simultaneously capturing of the emitted signals is shown. This operating mode can be performed with the LSTM system 300 of FIG. 5A, for example. Illumination sheet beams 353 and 354 are directed toward a first surface of a sample and illumination sheet beams 366 and 362 are directed toward an opposite surface of the sample. The two pairs of illumination beams in concert with the detection arms (not shown explicitly) including camera image detectors that discriminate respective pixel columns 350 and 360 capture illuminated linear volumes 219A and 219B at laterally different positions. This arrangement minimizes light interference between the two offset targets. Thus, by scanning with a phase difference between the two detection arms, two sides of a sample can be scanned simultaneously with minimal mutual interference.

The LSTM system may have a controller to perform a function that automatically performs a calibration by sparsely automatically sampling of the imaging planes at multiple positions in the sample. According to an embodiment, the LSTM system may be controlled to perform a sparse traversal of a large sample in order to extract parameters that affect the positions of the illuminated linear volumes 219 such as surface variations and variations in index of refraction. Thus, a sparse matrix of samples can be captured and analyzed for these variations and stored in order to create a fine traversal itinerary. This ultimately may speed and improve the imaging quality of the acquisition of optical data in a large sample. The traversal itinerary may employ adaptive correction of the detected parameters and interpolation of the parameters from the sparse intervals. The adaptive optics may correct, for example, light sheet displacement relative to the detection focal plane.

Figure 8:
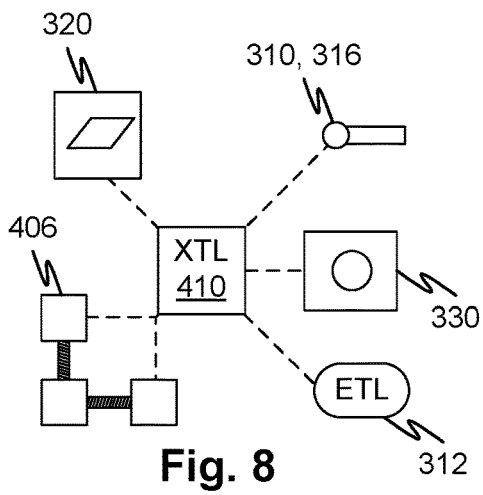
FIG. 8 illustrates a controller connected to actuators of the various embodiments to permit automated operation of the LSTM system, according to embodiments of the disclosed subject matter.
Figure 7A:
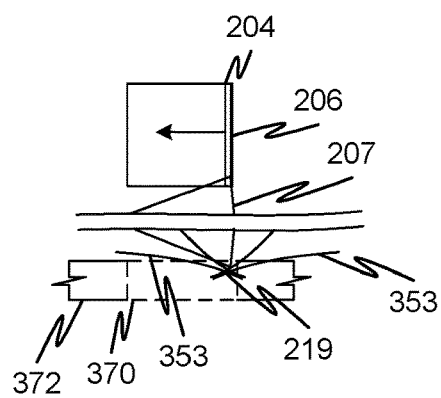
FIGS. 7A through 7E illustrate stages of a scan of a single "tile" of a larger slab which scan is performed optically for one of a matrix of positions of an X-Y-Z-theta stage that positions the slab, according to embodiments of the disclosed subject matter. Note that the line readout in camera and illumination can be synchronously scanned in opposite direction as well.
Figure 7B:
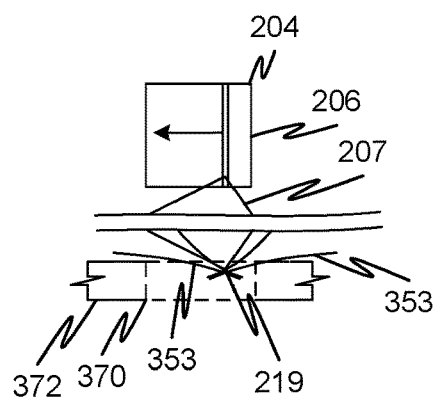
Figure 7C:
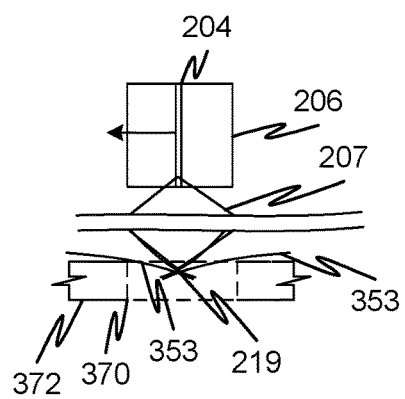
Figure 7D:
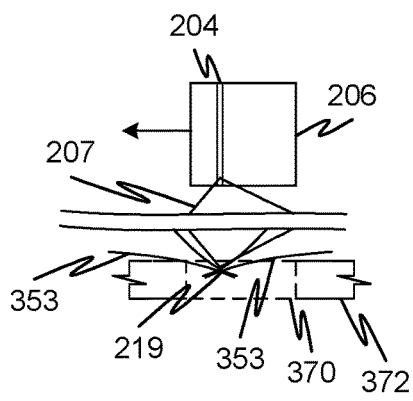
Figure 7E:
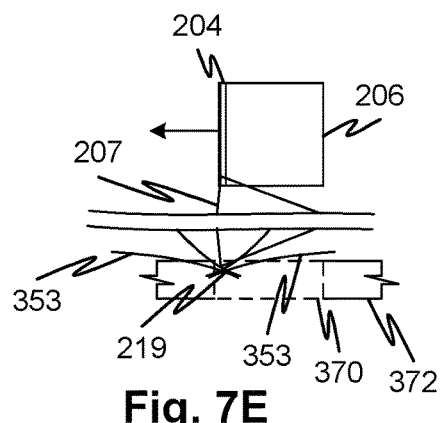

FIGS. 7A through 7E illustrate stages of a scan of a single "tile" of a larger slab which scan is performed optically for one of a matrix of positions of an X-Y-Z-theta stage that positions the slab, according to embodiments of the disclosed subject matter. FIG. 8 illustrates a controller connected to actuators of the various embodiments to permit automated operation of the LSTM system, according to embodiments of the disclosed subject matter. FIG. 7A shows illumination sheet beams 353 illuminating illuminated linear volume 219 in an initial position to the right of a tile 370 to be imaged at a fixed position of a slab 372. The slab may be moved by a traversing system 406 (See FIG. 8) that moves an X-Y-Z-theta stage, for example, under control of a controller 410. For a sequence illustrated in FIGS. 7A through 7E, the stage may remain in a fixed position after which it's z position may be changed in steps until an entire volume is scanned and then the stage moved to a different coordinate (See FIG. 9) to sample an array of tiles of a slab. The data may be composited to form an image of the slab, as discussed. In the sequence from FIG. 7A to 7E, the illumination beam is traversed by controlling the optical scanning device 320 with the controller 410. The controller may position the motorized flip mirrors 310, 316 to pass illumination light through the electrically tunable lens (ETL) 312. Thus, the sheet beams 353 will be moved progressively or in stages, a few of which are shown in FIGS. 7A-7E. At each position (progressive and continuous or discrete) the exposed pixel line 204 is sampled thereby selecting a then-current line image of the illuminated linear volume 219. The selection of image data of the camera, storage, and sampling as well as compositing may be performed automatically by the controller 410 connected to the camera 330.

Figure 20A:
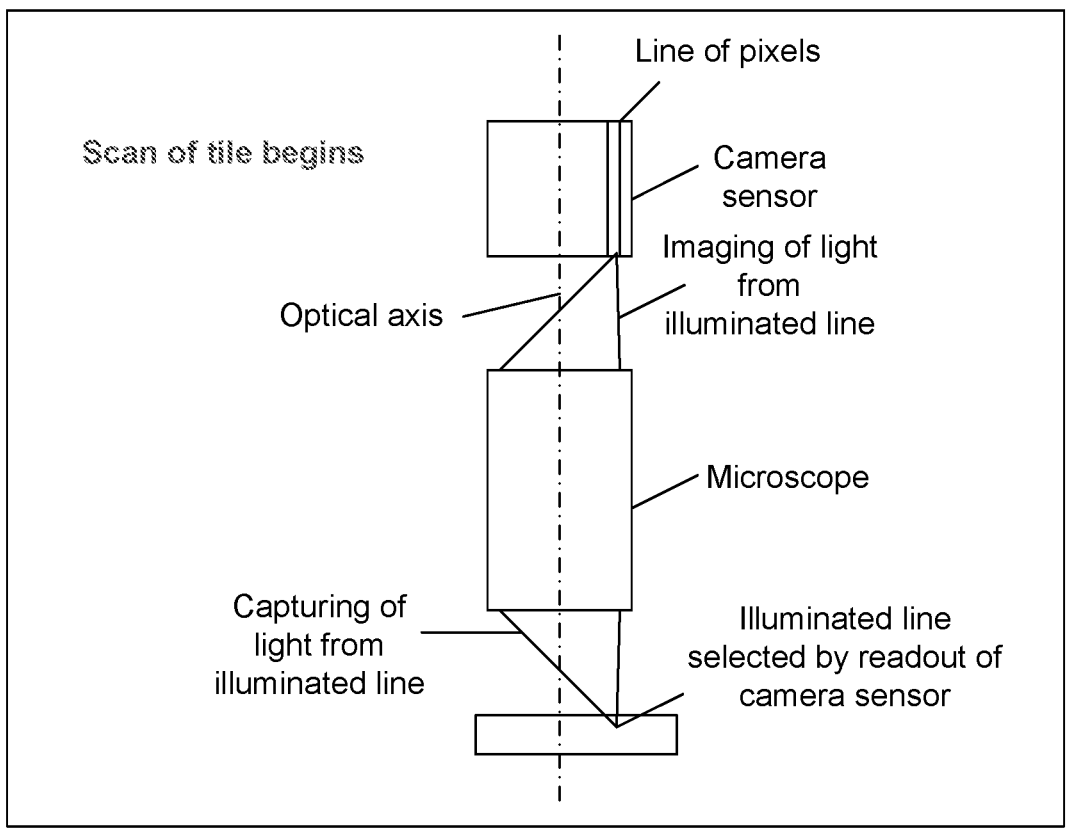
FIGS. 20A-20D illustrate an alternative scanning mechanism suitable for 1D or 2D scanning as described with reference to FIGS. 4A and 4B.
Figure 20B:
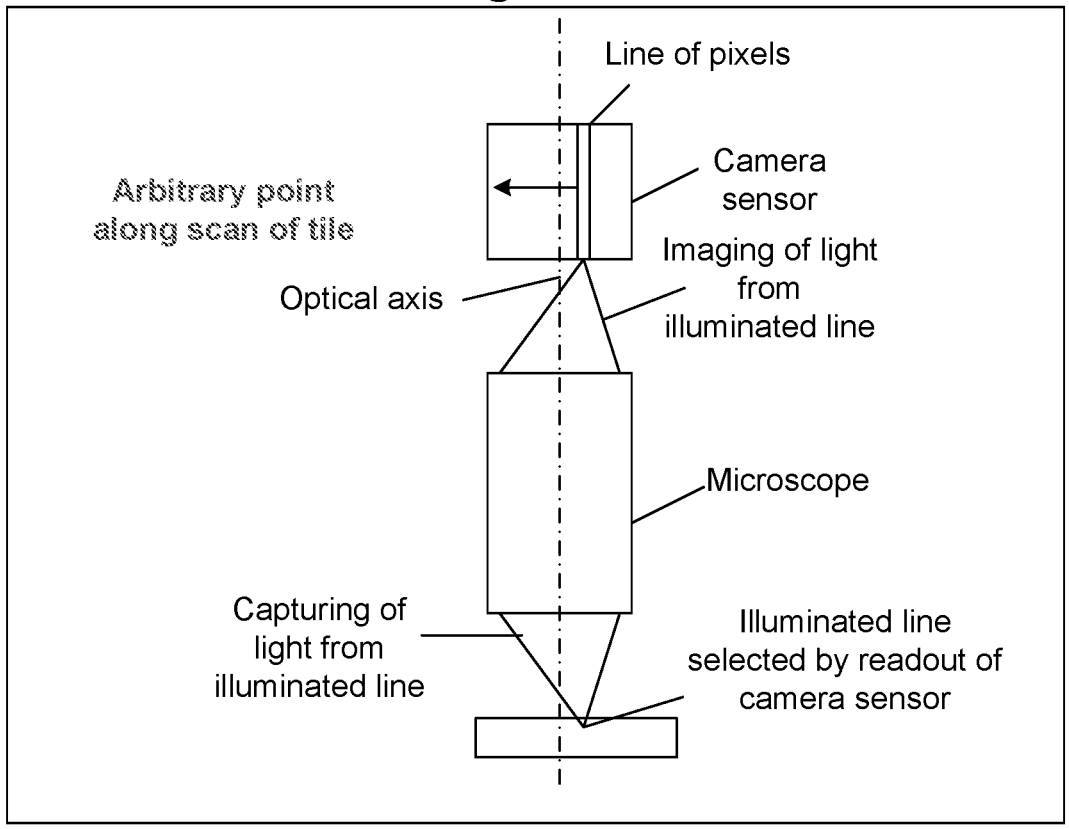
Figure 20C:
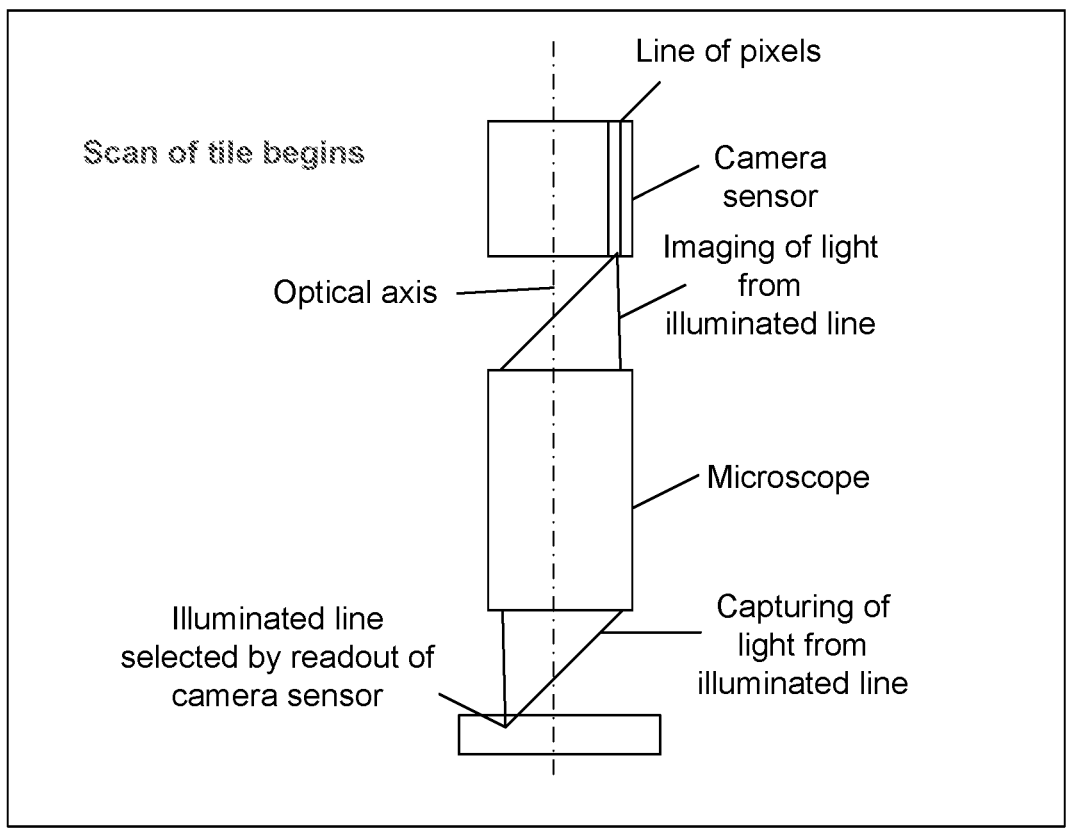
Figure 20D:
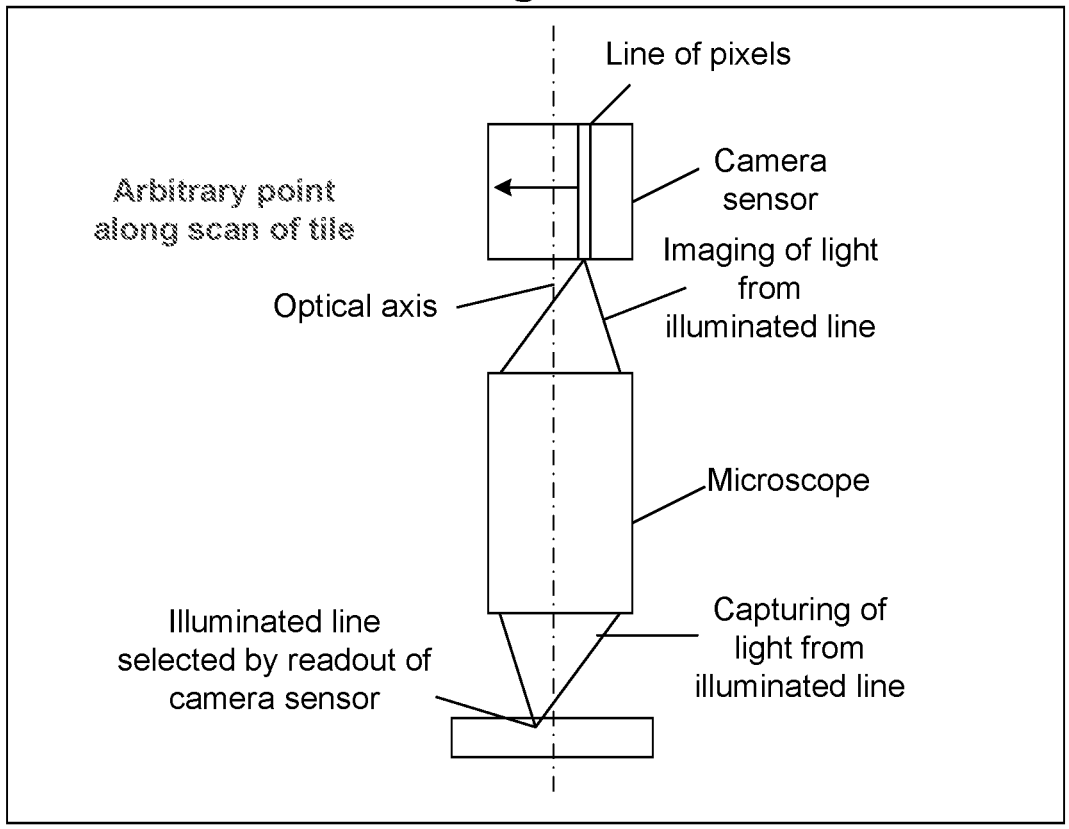

FIGS. 20A through 20D further illustrate what is happening during a scan. 20A and 20B show the projection of the illuminated line on the camera sensor at one end of the cross-axis scan and at an arbitrary intermediate point along the scan to an opposite end for a microscope that does not flip the position of the image across the optical axis. FIGS. 20A and 20B show the projection of the illuminated line on the camera sensor at one end of the cross-axis scan and at an arbitrary intermediate point along the scan to an opposite end for a microscope that does flip the position of the image across the optical axis.

Note that although the drawings of FIGS. 7A-7E suggest that the detection arm does not flip the image about the axis as would typically happen in microscopes. Embodiments in which the line source on one side of the optical axis are imaged on an opposite side are also contemplated in this context.

Figure 9:
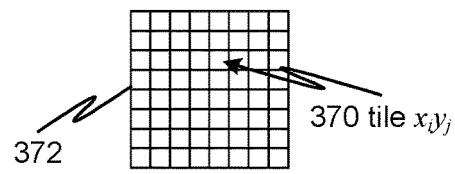
FIG. 9 shows the compositing of the images of multiple tiles to create a 3D image of slab, according to embodiments of the disclosed subject matter.

FIG. 9 shows the compositing of the images of multiple tiles to create a 3D image of slab, according to embodiments of the disclosed subject matter. Each tile may be formed by the sequence illustrated in FIGS. 7A-7E and for each, z-axis slices may be acquired. An array of tiles—multiple ones for each level of depth acquired—may be obtained to image a slab volume. The speed may be doubled by acquiring samples at two depths simultaneously using a system such as described with regard to FIG. 5A.

Figure 10:
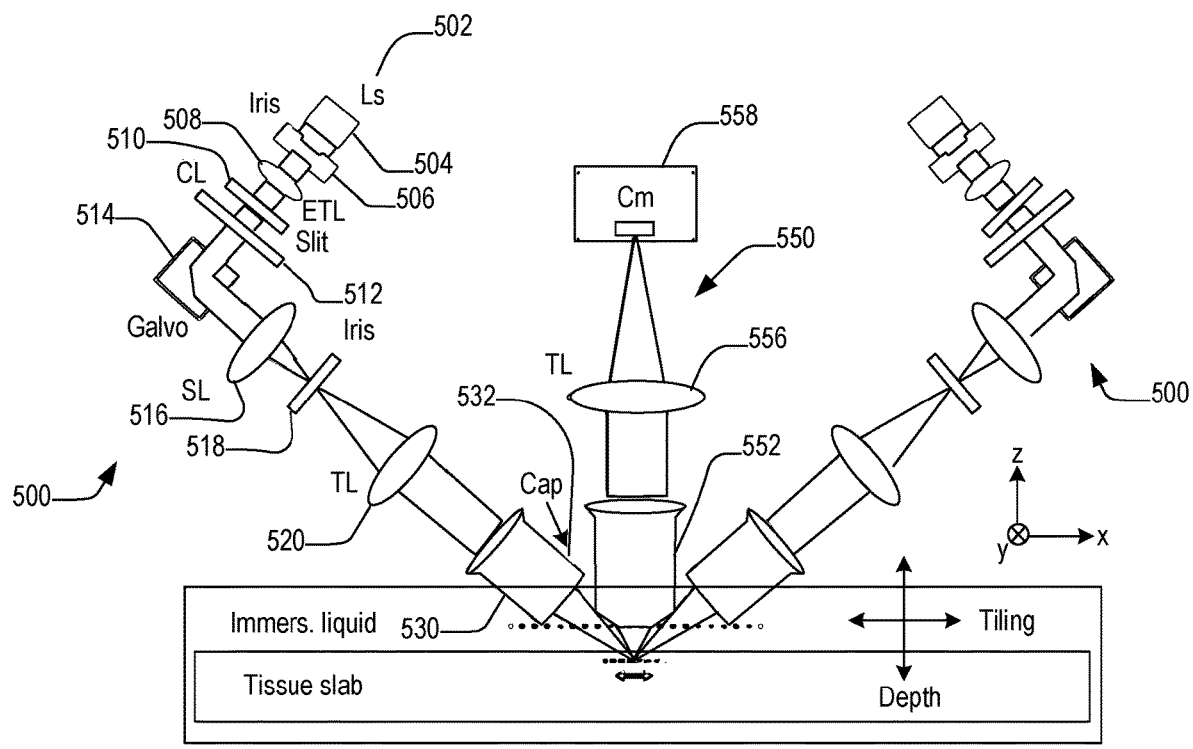
FIG. 10 is a block diagram of another embodiment for implementing LSTM.

FIG. 10 depicts another embodiment for implementing LSTM. Each of the illumination arms 500 in this embodiment includes a LASER source 502, collimators 504 (e.g., using ~10 mm output beam diameter), ETL 508, cylindrical lens 512, galvo scanner 514, scan lens 516, tube lens 520 and illumination objective 530 (e.g., a Olympus Macro 4×/0.28 NA). In this embodiment, a first iris 506 is incorporated after the collimator 504 to remove the peripheral spread of Gaussian beams; a one dimensional slit 510 is incorporated before the cylindrical lens 512, to control the effective numerical aperture of illumination; and a second iris 518 is incorporated at the conjugate plane, between scan lens 516 and the tube lens 520, to control the light sheet height for minimizing unwanted illumination. In some embodiments, a stop (not shown, but similar to the stop 326 in the FIG. 5A embodiment) may be provided just before the illumination objective 530.

In some embodiments, the illumination arms 500 are mounted at an approximately 60° angle relative to the detection arm 550 fixed on an optic table. In alternative embodiments, this angle may vary within the parameters discussed in connection with FIG. 15B. Optionally, to facilitate the optical alignment of the system, all the three optical arms 500, 550 may be mounted on two manual translation stages. Optionally, an open top sample chamber filled with an immersion oil (e.g., with a Refractive Index of 1.454) may be used. Optionally, samples may be mounted in a quartz cuvette attached to the base of the sample chamber.

In this embodiment, two thin light sheets are generated by using two illumination optical arms 500. When the illumination objectives are air objectives, a 3D printed cap with a coverslip (e.g., a 1 inch diameter quartz coverslip) may be used to seal the objective for oil immersion use.

The detection arm 500 in this embodiment includes a detection objective 552 (e.g., Olympus 10×/0.6 NA/8 mmWD or 25×/1.0 NA/8 mmWD), a tube lens 556, and an sCMOS camera 558 (e.g., a Hamamatsu Orca Flash 4.0 V3). In some preferred embodiments, an emission filter (not shown) is disposed between the detection objective 552 and the tube lens 556.

A list of suitable parts and their sources that may be used in this embodiment is provided in Table 1.

TABLE 1

| Source | Cat. Number | Qty | Description |
| --- | --- | --- | --- |
| | | | Detection unit |
| Thorlabs | CXY2 | 1 | 60 mm Cage System Translating Lens Mount for Ø2" Optics |
| Thorlabs | LCP90F | 1 | 60 mm Removable Cage Plate |
| Thorlabs | SM2A20 | 1 | SM2-M38 ADAPTER FOR NIKON TUBE LENS |
| Thorlabs | SM2L30-SM2 | 2 | SM2 Lens Tube, 3" Thread Depth, One Retaining Ring Included |
| Thorlabs | LCP09 | 2 | 60 mm Cage Plate with Ø2.2" Double Bore for SM2 Lens Tube Mounting |
| Thorlabs | ER10 | 4 | Cage Assembly Rod, 10" Long, Ø6 mm |
| Thorlabs | SM1A1 | 1 | Adapter with External SM05 Threads and Internal SM1 Threads |

TABLE 1-continued

| Source | Cat. Number | Qty | Description |
|---|---|---|---|
| Thorlabs | SM2A31 | 1 | Adapter with External C-Mount Threads and Internal SM2 Threads |
| Hamamatsu | C13440 | 1 | Digital camera |
| Custom | ObjAdater | 1 | Custom made Adapter from SM2 to M34 threading |
| Thorlabs | SM2V10 | 1 | Ø2" Adjustable Lens Tube, 0.81" Travel |
| Olympus | XlPlan N, 10X | 2 | Oil immersion Objective |
| Thorlabs | LCP01B | 2 | 60 mm Cage Mounting Bracket |
| Thorlabs | RS2 | 2 | Ø1" Pillar Post, ¼"-20 Taps, L = 2", 8-32 Adapter Included |
| Thorlabs | TBB0606 | 2 | Large-Area Translation Stage, 6" × 7.66" |
| | | | Two Illumination units |
| Thorlabs | SM2V10 | 2 | Ø2" Adjustable Lens Tube, 0.81" Travel |
| Custom | ObjAdater | 2 | Custom made Adapter from SM2 to M34 threading |
| Olympus | Macro 4x/0.28NA/ 29.5WD | 2 | Air Objective |
| Thorlabs | SM2A20 | 2 | SM2-M38 ADAPTER FOR NIKON TUBE LENS |
| Thorlabs | CXY2 | 2 | 60 mm Cage System Translating Lens Mount for Ø2" Optics |
| Thorlabs | LCP09 | 2 | 60 mm Cage Plate with Ø2.2" Double Bore for SM2 Lens Tube Mounting |
| Thorlabs | LCP01B | 4 | 60 mm Cage Mounting Bracket |
| Thorlabs | RS2 | 4 | Ø1" Pillar Post, ¼"-20 Taps, L = 2", 8-32 Adapter Included |
| Thorlabs | TBB0606 | 4 | Large-Area Translation Stage, 6" × 7.66" |
| Thorlabs | ER05 | 8 | Cage Assembly Rod, ½" Long, Ø6 mm |
| Thorlabs | LCP02 | 6 | 30 mm to 60 mm Cage Plate Adapter, 8-32 Tap |
| Thorlabs | LJ1695RM-A | 2 | Ø1", N-BK7 Mounted Plano-Convex Round Cyl Lens |
| Thorlabs | CRM1L | 2 | Cage Rotation Mount for Ø1" Optics, Double Bored with Setscrew, 8-32 Tap |
| Thorlabs | CP20S | 2 | 30 mm Cage System Iris, Ø20.0 mm Maximum Aperture |
| Thorlabs | CP90F | 2 | 30 mm Removable Cage Plate, Front and Back Plate, Internal SM1 Threading |
| Thorlabs | CXY1 | 2 | 30 mm Cage System, XY Translating Lens Mount for Ø1" Optics |
| Thorlabs | CP12 | 2 | 30 mm Cage Plate, Ø1.2" Double Bore for SM1 Lens Tube Mounting |
| Thorlabs | LCP01 | 4 | 60 mm Cage Plate, SM2 Threads, 0.5" Thick, 8-32 Tap (Two SM2RR Retaining Rings Included) |
| Thorlabs | CLS-SL | 2 | Scan Lens with Large Field of View, 400 to 750 nm, EFL = 70 mm |
| Thorlabs | ER18 | 6 | Cage Assembly Rod, 18" Long, Ø6 mm |
| Thorlabs | LCP50S | 2 | 60 mm Cage System Iris, Ø50.0 mm Maximum Aperture |
| Optotune | EL-16-40-TC-VIS-5D-C | 2 | Electrically Tunable Lens |
| Thorlabs | ER4 | 18 | Cage Assembly Rod, 4" Long, Ø6 mm |
| Thorlabs | VA100C | 2 | 30 mm Cage System Adjustable Slit, 8-32 Tap, Imperial Micrometer |
| Thorlabs | GVS001 | 2 | 1D Galvo System, Silver-Coated Mirror, PSU Not Included |
| Thorlabs | GCM001 | 2 | 1D Galvo 30 mm Cage System Mount |
| Omicron | Custom | 2 | Collimator with ~10 mm bead diameter output |
| Omicron | SOLE-6 | 1 | LASER engine with 4 lines: 405, 488, 561, 647 nm |
| | | | Mounting Base |
| Thorlabs | MB1236 | 1 | Aluminum Breadboard 12" × 36" × ½", ¼"-20 Taps |
| Thorlabs | RS12 | 4 | Ø1" Pillar Post, ¼"-20 Taps, L = 12", 8-32 Adapter Included |
| Thorlabs | C1001 | 4 | Post Mounting Clamp for Ø1" Post |
| | | | Motorized XYZ Stage and sample mounting |
| Thorlabs | LNR50S | 3 | 50 mm (1.97") TravelMax Translation Stage, ¼"-20 Taps |
| Thorlabs | LNR50P3 | 1 | XY Adapter Plate for LNR50 TravelMax Stages, Imperial Hole Spacings |
| | LNR50P2 | 2 | Right-Angle Bracket for LNR50 TravelMax Stages, Imperial Threads |
| Custom | Sample chamber | 1 | Custom made 3D printed sample chamber |
| | | | Controls & electronics |
| National Instruments | PXIe-PCIe8381 | 1 | Control PCIe card for PXI chasis |
| National Instruments | NI PXIe-1028 | 1 | PXI express chasis |
| National Instruments | 7852R | 1 | FPGA card |
| National Instruments | 7842R | 2 | FPGA card |
| Thorlabs | GPS011 | 1 | Galvo System Linear Power Supply |

TABLE 1-continued

| Source | Cat. Number | Qty | Description |
| --- | --- | --- | --- |
| Thorlabs | LEDD1B | 2 | T-Cube LED Driver with Trigger Mode, 1200 mA |
| Thorlabs | BSC203 | 1 | BSC203-Three-Channel APT ™ Benchtop Stepper Motor Controller |
| Markettech | SOLE-6 | 1 | 6 Laser Light Engine with 4 wavelengths |
| Serversdirect | Custom | 1 | Custom workstation with Supermicro X10DRHCT Motherboard, 24 TB SSD Hard Disks (EVO 850), 256 GB RAM (Crucial RDIMM DDR4), Quadro K4200 Graphics card. |

Because LSTM involves scanning of a line illumination-detection profile generated by the intersection of the light sheet and the detection plane, some preferred embodiments use static sheets (generated by the use of a cylindrical lens and associated optics), instead of a dynamic sheet (generated by rapid scanning of a pencil beam) to maximize imaging speeds. But some alternative embodiments can use dynamic sheets.

A galvo scanner 514 is used to achieve rapid translation of light sheets perpendicular to their propagation direction. For the 2-AS mode, rapid translation of the thinnest part of the sheet along the propagation direction is required. This may be accomplished using a variety of approaches including but not limited to using fast piezo motors to translate the illumination objectives, using holographic spatial light modulators or an electrically tunable lens (ETL) 508 to induce divergence and convergence of a collimated beam. The use of piezo motors for rapid scanning of objective often results in vibrations and require additional settling time, and the spatial light modulators are limited in modulation speed because of slower refresh rates. ETLs, on the other hand, can achieve high frequency modulation of focal plane position without the need for moving optics of significant mass. Accordingly, some preferred embodiments use ETLs 508. In practice, an ETL based approach has proven to be highly effective for achieving uniform simultaneous 2-axes scanning.

One way to optically align the LSTM assembly is to place a prism mirror (e.g., with fine scratches in the center) in the focal plane of detection optics, to visualize the location and cross-section of the light sheet relative to the detection focal plane. The light sheet positioning parameters can then optimized such that the thinnest part was in alignment with the center of the field-of-view of the detection plane. Next, the mirror can be replaced with a high concentration (>2%) agarose gel containing fluorescent beads (Note. The high concentration of agarose may be used to ensure that only the surface plane of the agarose gel is visible during the alignment optimization.). By examining the extent and quality of the illuminated beads located on the surface, optimal galvo scanner and ETL parameters for achieving uniform planar illumination across the entire field-of-view can be identified.

Figure 11A:
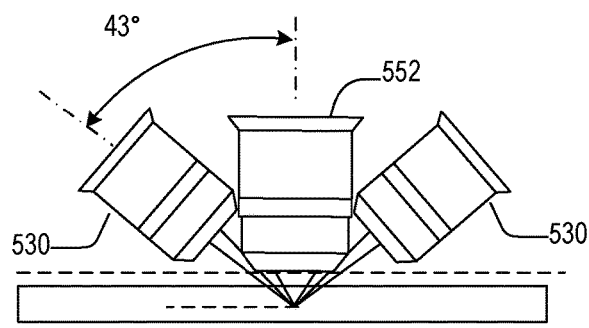
FIGS. 11A-B depict the physical geometric constraints for the objectives in the FIG. 10 embodiment.
Figure 11B:
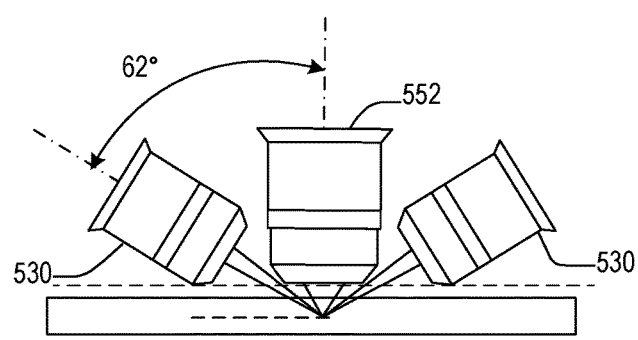
Figure 15A:
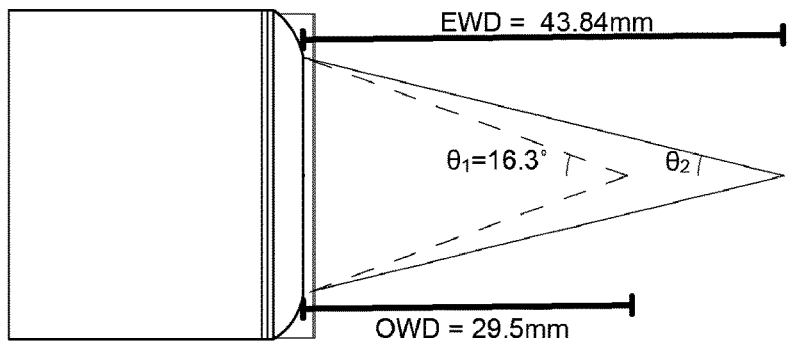
FIG. 15A depicts a calculation of an effective working distance for an illumination objective.
Figure 15B:
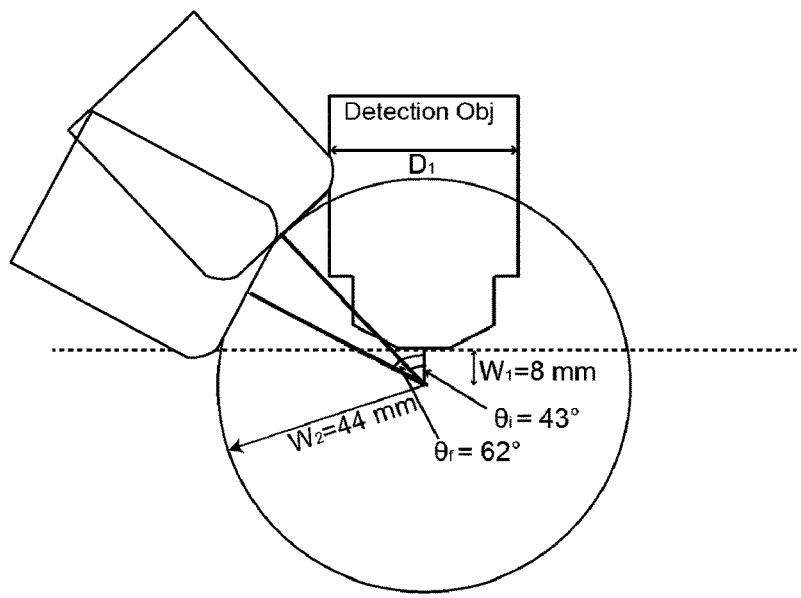
FIG. 15B depicts the range of allowable angular positions for the objectives in the FIG. 10 embodiment.

A series of calculations was used to assess and compare various properties of the FIG. 10 embodiment. The results of these calculations are summarized in FIGS. 15A and 15B. First, the physical geometric constraints of arranging a given set of detection and illumination objectives in a non-orthogonal configuration were calculated (FIGS. 15A-B). The main physical parameters used in the calculations are the working distances and the diameters of both the illumination objectives 530 and detection objectives 552. Next, the range of physically-allowable, relative angular arrangements that enable light sheets to intersect the detection focal plane at their thinnest parts (while also ensuring that illumination objectives remain above the physical extent of the detection objective) were calculated. For instance, when an Olympus Macro 4×/0.28 NA/29.5 mmWD is used as the illumination objective and an Olympus 10×/0.6 NA/8 mmWD is used as the detection objective, only angular configuration of 43.3° to 62.3° are possible. This can be calculated from the physical geometric constraints on the arrangement of illumination objectives by analyzing the two opposite bounds (FIGS. 11A-B and 15B): the illumination objective not to touch the detection objective (FIG. 11A) and the illumination objective not going below the physical extent of the detection objective (FIG. 11B). The range of allowable angular positions can be calculated by taking the effective working distances and the objective diameters into account as shown in the schematics of FIG. 15B, resulting in the following relationships:

$$W2 * \sin(\theta i) = \frac{D1}{2} + D2 * \frac{\cos(\theta i)}{2}$$

$$W2 * \cos(\theta f) = W1 + D2 * \frac{\sin(\theta f)}{2}$$

where W1 and W2 are the working distances of the detection and illumination objectives respectively, D1 and D2 are the diameters of the detection and illumination objectives respectively, and $\theta i$ and $\theta f$ are the boundary angular positions. When the objectives are designed to be used in air, Snell's law may be used to calculate the approximate effective working distance (e.g., in a refractive index liquid of 1.454, as shown in FIG. 15A), resulting in ~44 mm, and the objective diameter (lowest part of the tapered ending) was measured to be ~28 mm. For many experiments values of W1=8, and D1=40 were used.

FIG. 15A shows approximate calculations of the effective working distance (EWD) for an Olympus Macro 4×/0.28 NA/29.5 WD air illumination objective when used in an immersion liquid with refractive index 1.454. Original working distance (OWD) is the working distance in air according to the objective specifications. A thin quartz coverslip and a 3D printed cap were used to seal the illumination objectives. EWD was estimated to be 43.84 mm.

Figure 12A:
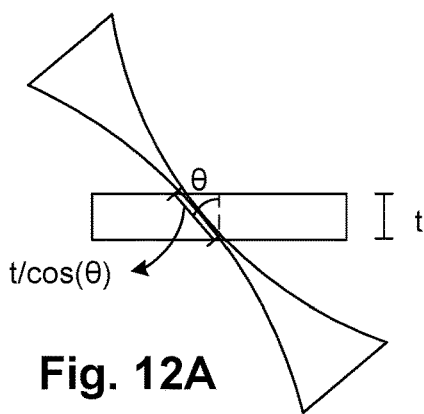
FIGS. 12A-D depict a comparison of the illumination path lengths of the FIG. 10 embodiment and LSM for a sample of the same thickness and width.
Figure 12B:
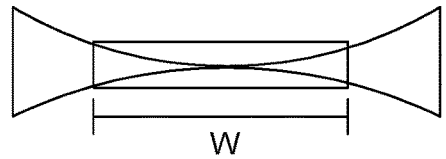

12 depicts the influence of angular separation of the illumination arms 500 and the detection arms 550 in the FIG. 10 embodiment on the resulting image volumes and a comparison of the illumination path length of LSTM vs. LSM. In LSM, the illumination light sheet needs to penetrate the entire width (w) of the sample (FIG. 12B), whereas in LSTM the effective illumination path length depends on the angular arrangement and tissue thickness(t): t/cos($\theta$) where t is the sample thickness to be imaged and $\theta$ is the angle between the illumination propagation direction and the detection axis (FIG. 12A). Thus, from an illumination path length stand point, minimizing the angular separation will increase illumination penetration.

Figure 12C:
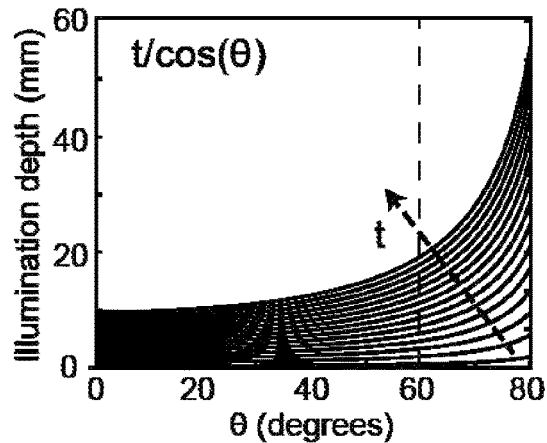

The graph in FIG. 12C plots the dependence of illumination depth of LSTM on θ. Each curve represents a different tissue thickness(t), as marked by the arrow in the direction of increase in thickness. When the effect of θ on the effective light sheet thickness (approximated as b/sin(θ), which determines the axial resolution, is measured, an inverse relationship is found: increasing θ provides better the axial resolution. Because illumination is provided via a low NA objective for which the light scattering has much smaller effect on the illumination side, some embodiments maximize the angular separation at ~60° to achieve higher axial resolution. The experiments discussed herein were performed using this configuration.

Figure 12D:
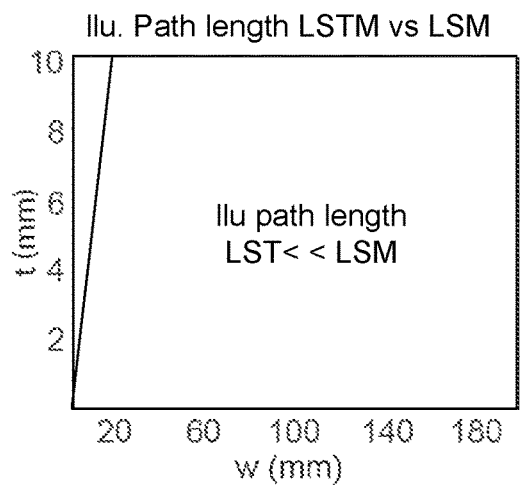

The graph in FIG. 12D compares the illumination depth required to image a sample of given width and thickness. The ratio of the LSTM and LSM illumination path was converted into a binary representation by thresholding at 1, and plotting the results as a heat map to summarize the parameters ranges where LSTM (the region on the right) and LSM (the region on the left) need smaller illumination depth, and hence which approach will provide better image quality.

The imaging performances of LSTM and LSM was compared using a thick (~5 mm deep and ~2 centimeters wide) cleared rat brain section stained for vasculature, with a highly transparent sample with bright uniformly distributed signal. LSTM enabled imaging of the entire sample with uniform high-resolution, whereas the lack of penetration of the illumination light sheets in LSM resulted in progressively poorer image quality towards the center of the tissue. These and other experiments help demonstrate the suitability of LSTM for quantitative high-resolution imaging of large samples, without any limits on lateral sizes.

The use of lower NA illumination in LSTM 1-AS configuration in a large sample was tested in a CLARITY-cleared thick coronal section of Thyl-eYFP transgenic mouse brain. Low numerical aperture illumination was used to generate a large field-of-view (and hence thicker light sheets). While, the LSTM 1AS mode allowed for high-quality imaging of the section, image quality was reduced for peripheral portions of the field-of-view. This result was similar to the imaging performance of a LSM system employing Gaussian beams for illumination.

Next, the imaging performance of LSTM in simultaneous 2-AS mode was assessed using a thick (~9.6 mm×13.5 mm×5.34 mm) coronal section of CLARITY-cleared Thyl-eYFP transgenic mouse brain, with 10×/0.6 NA/8 mmWD and 25×/1.0 NA/8 mm objectives. A larger input beam diameter was used to employ full NA (0.28) of the illumination objective. With this configuration, LSTM provided rapid high-resolution quantitative imaging of these large samples without any reduction in the image quality across the sample dimensions.

As a follow up to these experiments, an entire intact cleared mouse brain (with connected spinal cord) of Thyl-eYFP transgenic mouse was successfully imaged. A detailed high-resolution 3D rendering was performed and it demonstrated uniform, high quality imaging. One can therefore conclude that LSTM allows high-resolution quantitative imaging of large intact biological systems with no limitations on the lateral dimensions. Sample thickness that can be imaged remains limited by the working distance of the detection objective and also by level of tissue transparency and penetration of labelling reagents.

Figure 13A:
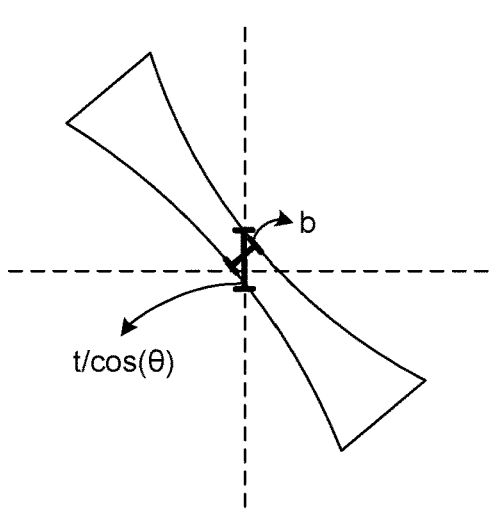
FIGS. 13A-B depict the effective light sheet thickness for the FIG. 10 embodiment.
Figure 13B:
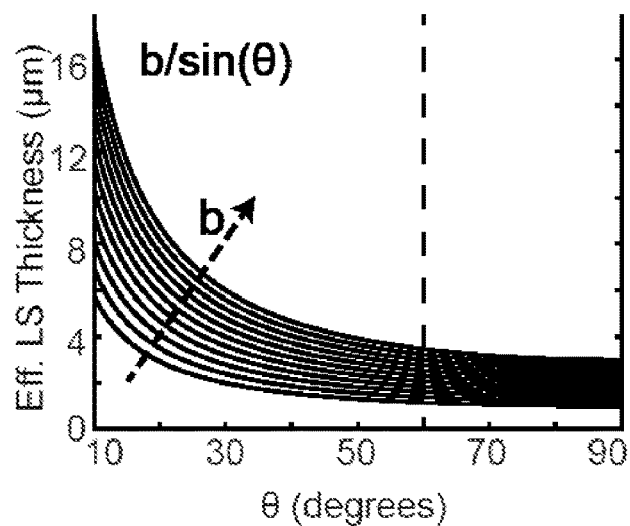
Figure 14A:
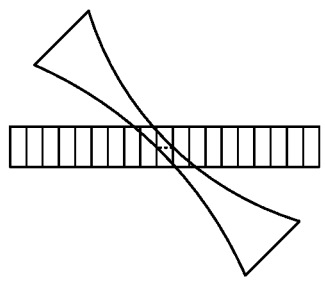
FIGS. 14A-D depict a comparison of energy load on the sample in LSM and the FIG. 10 embodiment.
Figure 14B:
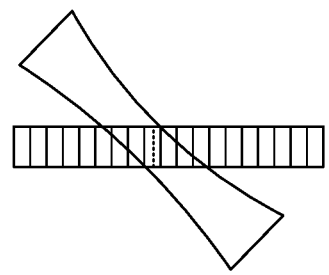
Figure 14C:
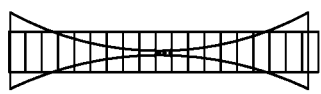
Figure 14D:
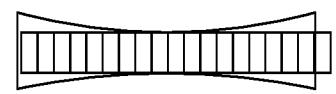

Due to the non-orthogonal incidence of the light sheet on the detection plane, the effective light sheet thickness can be approximated as the projection of the original thickness on to the detection direction, resulting in b/sin(θ), where b is the original light sheet thickness at the most focused position, and θ is the angle of incidence relative the detection axis. FIGS. 13A-B depict this relationship, and shows that effective planar illumination thickness can be approximated as b/sin(θ). More specifically, FIG. 13A shows the geometry and FIG. 13B plots the effective light sheet thickness as a function of θ for different values of b (the arrow points in the direction of increasing b value).

FIG. 14 depicts a comparison of energy load on the sample in LSTM and LSM. The two rows compare the time-accumulated energy load in LSTM and LSM for imaging a single plane (FIGS. 14A and 14C, respectively) and a single image stack tile (FIGS. 14B and 14D, respectively). The energy load in LSTM is dependent on the sample thickness, and in LSM on the sample width. For larger samples LSTM energy load is similar to LSM.

Figure 16:
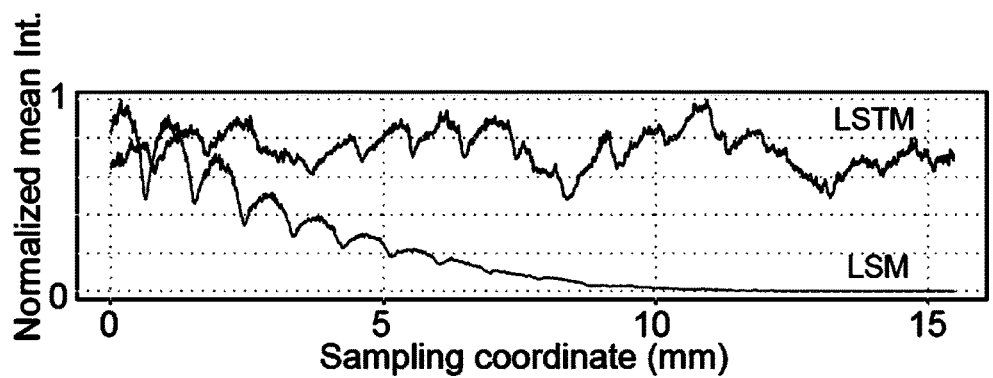
FIG. 16 compares LSTM and LSM imaging of a ~2 cm wide and ~5 mm thick rat brain slice, stained for vasculature.

FIG. 16 compares the normalized mean intensity for LSTM and LSM imaging of a ~2 cm wide and ~5 mm thick rat brain slice, stained for vasculature. The images used for the FIG. 16 comparison were maximum intensity z-projections, and were acquired using 10×/0.6 NA objective. FIG. 16 profiles the mean (in the vertical direction) intensity across the region of interest (ROI). Due to the scattering of the illumination light sheet, the image signal in LSM is degraded towards the interior of the sample, whereas LSTM allows uniform quality imaging across the entire sample.

Figure 18:
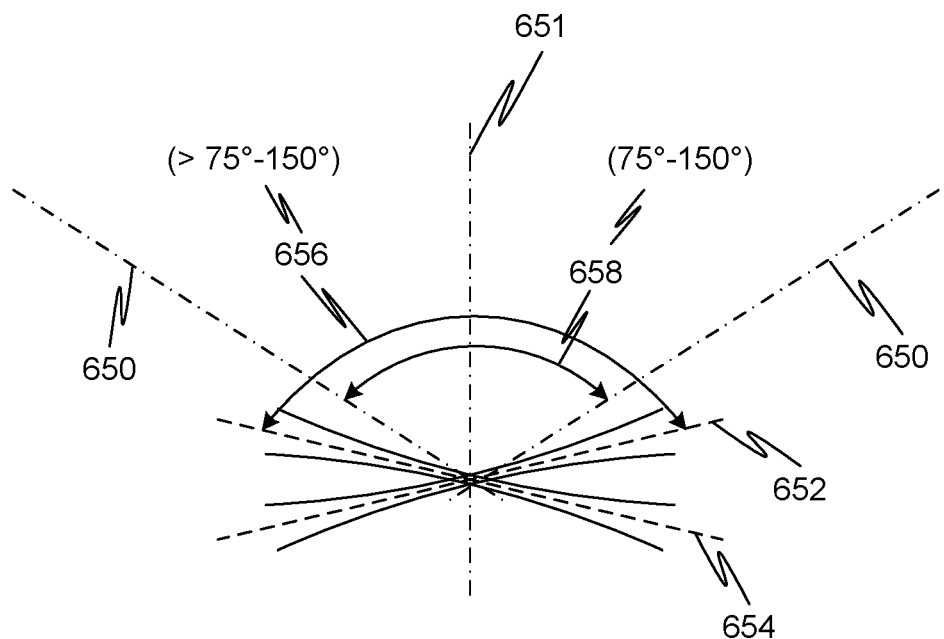
FIG. 18 illustrates relationships of angles between features of certain embodiments.

FIG. 18 shows the relative angles formed by illumination optical axes 650 (one for each of two illumination objectives or one alone for a single illumination objective), major plane or axis 652 and 654 of the illumination beams such as when emitted from the perimeter of the objective so as to be at a shallower angle than the illumination objective optical axis 650. The angle 658 between the illumination objective axes 658 is smaller than the angle 656 between the major plan or axes 652 and 654. The drawing shows a range of angles for each that is constrained to avoid interference between a detection objective (optical axis indicated at 651) and the illumination objectives.

Throughout the specification, reference to embodiments includes those defined by the claims. Thus, any proposed modifications to embodiments contemplates corresponding variations of the claims and such variations are considered to be disclosed in the present application.

Many of the disclosed embodiments contemplate the use of one or more movable stages carrying specimens, optical components, or both. The details of such devices and technology which are sufficient to implement the disclosed embodiments and variations thereof are in the public domain and are therefore not disclosed.

Figure 17A:
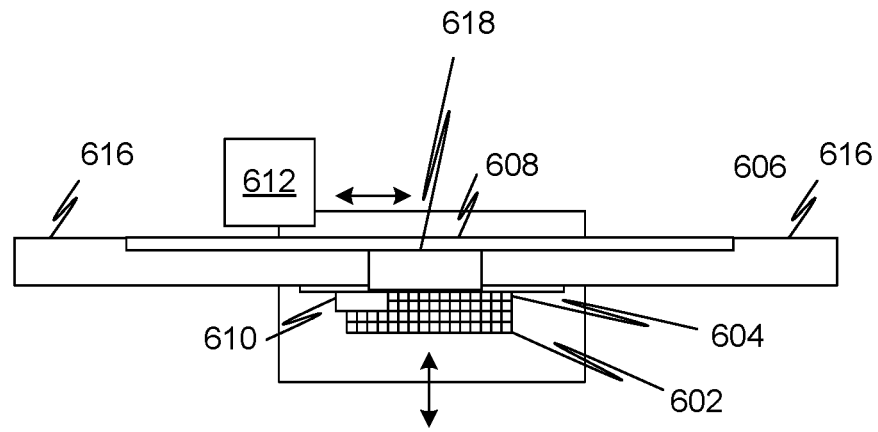
FIGS. 17A and 17B illustrate LSTM system with an integrated microtomy apparatus, according to an embodiment of the disclosed subject matter.
Figure 17B:
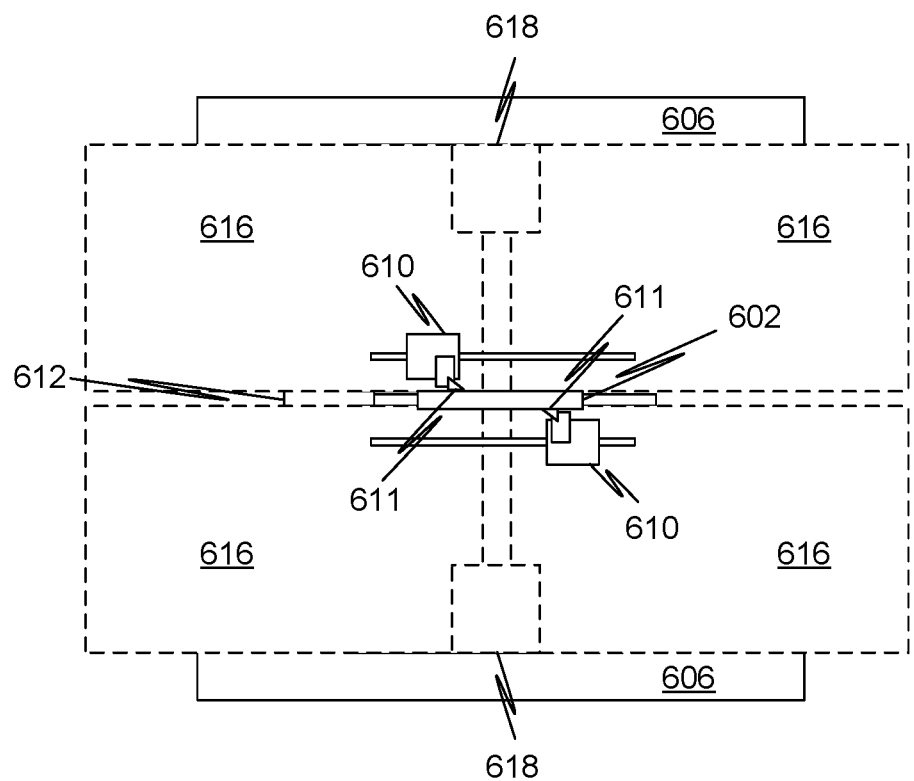

Motion stage-driven microtome may also be combined with the disclosed LSTM microscope embodiments. The microtome may be controlled automatically, in synchrony with a tile-wise scan of a sample, to remove a layer of the sample after an outer layer has been scanned into memory. Once a layer is removed, the traversing system can move the excitation and detection arms to scan the exposed deeper layer automatically. A microtome may be provided for opposite surfaces of a sample, for example, separate microtomes may be provided for the opposing sample faces of the embodiment of FIG. 5A. FIG. 17A illustrates figuratively illustrates the embodiment of FIG. 5A with microtomes 610 positioned with respect to opposing faces of a sample 602 to shave, in steps, outer surfaces of the sample 602. A traversing attachment including a movable stage may provide X-Y, and or Z positioning of a knife 611 relative to the sample 602. The detection and excitation optics are indicated as outlines at 618 and 616 respectively. A main support is indicated at 606. The automatic sequential positioning of the knife may be accomplished using a very short traverse to remove a tile-sized layer at a time, or regions the size of multiple tiles may be removed at a time. At least part of the traversal of the knife may be accomplished using the traversing system used for relative positioning of the optics and 616, 618 and sample 602 during scanning.

In any of the embodiments, further processing such as compression, may be performed on acquired data in parallel with scanning. For example, as the optical data are acquired for a tile, the data from a previous tile may be further processed to reduce the data volume, for example, by algorithms such as JPEG2000 2D or JPEG2000 3D. The further processing may also include other image processing tasks such as image segmentation, feature recognition or other data reduction procedures.

It will be understood that although a camera is shown for each detection arm, in alternative embodiments, a single camera can receive light, with a suitable optical arrangement, from both sides of a slab to be imaged.

Figure 19:
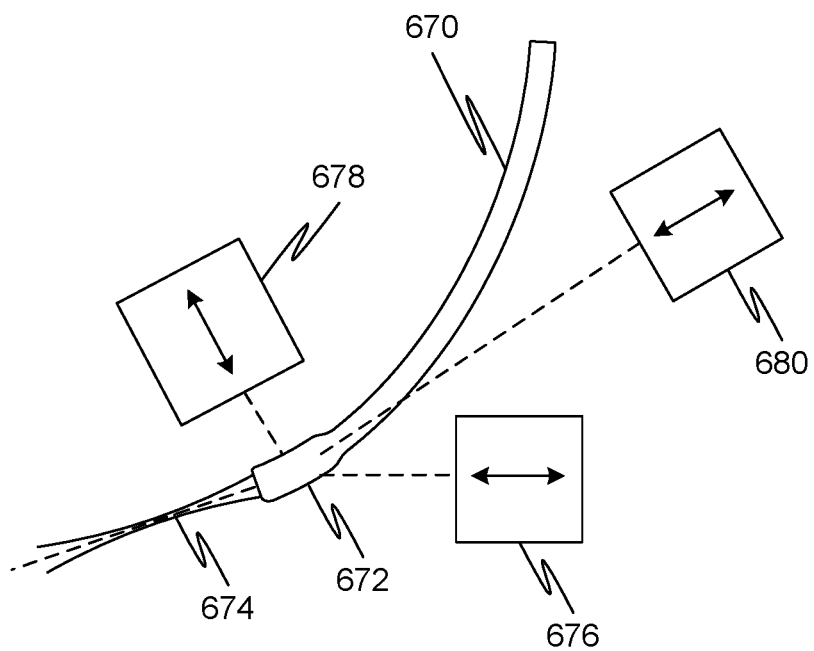
FIG. 19 illustrates GRIN lens embodiments for forming light sheets.

Note that in any of the embodiments employing an electrically tunable lens, any other suitable mechanism configured to move the sheet beam waist along an axis of the illumination objective may instead, or additionally—as feasible may be employed. These include, but are not limited to, alone or in combination, acousto-optics tunable lenses, spatial light modulators, digital micromirror devices or mounting of illumination objective on a piezo motor, gradient-index (GRIN) lenses, micro electromechanical machines (MEMS) carrying fibers, beam redirectors, for example a GRIN lens at the end of a fiber driven by a MEMS motor. See, for example, "Multimode fibre: Light-sheet microscopy at the tip of a needle by Ploschner at al, (http://dx.doi.org/10.1038/srep18050). Those of skill in the art will recognize that other equivalent or similar mechanisms may also be used. FIG. 19 illustrates a fiber 670 carrying a GRIN focusing element 672 that forms a light sheet 674. To implement the scanning mode of FIG. 4A, a motor such as a piezo motor, MEMS motor, servo, stepping or any other type of motor and drive 678 may drive the GRIN lens as illustrated. A light source is not shown but is understood to be provided. To implement the scanning mode of FIG. 4B, a similar type of motor and drive 678 and 680 may be used to move the GRIN lens as illustrated in concert to move a line of maximum intensity light of a resulting sheet beam along a path normal to a detection objective optical axis or a single motor and drive 676 may be used to scan across the same path. The dashed coupling line between the motor and GRIN lens indicate mechanical coupling.

Suitable mechanisms such as stage on tracks, linkages, or flexible composite structures can be used to maintain the orientation of the GRIN lens throughout the sweep of the scan. Note that other sweep paths may be implemented other than those shown in FIGS. 4A and 4B as well as FIG. 19 such as an arc sweep or combinations of the illustrative modes.

In any embodiment described as including an sCMOS camera, other suitable imaging devices may be substituted, including, but not limited to CCD or line detectors.

As used in the current specification and in the claims, the term "objective" may refer to any lens or set of lens capable of being used as an objective or a part thereof. So, for example, the excitation arm is described, in embodiments, as using an objective to form a sheet beam. In this role it is not used for forming an image but the optical element itself may have features of an objective including characterizing features such as a numerical aperture.

In any of the embodiments, provisions may be made to alter the depth of field of the microscope and to select a number of depths to scan for a given tile in order to increase the speed of throughput for live imaging of tissue samples, for example. The depth of field may be selected by any suitable mechanism such as an objective turret selector or replaceable objectives.

According to first embodiments, an optical imaging apparatus includes a first illumination arm having optical components arranged for forming a first sheet beam. A first detection arm has a front focal plane and having optical components for imaging a linear volume where the sheet beam intersects the front focal plane. The first illumination arm and first detection arm optical components each include a respective illumination objective and detection objective, the angle of the first sheet beam is oblique to the optical axis of the illumination objective, and the first detection arm front focal plane is perpendicular to the detection objective. The first embodiments include variants in which the first illumination arm optical components include scanning components that cause a beam waist of the sheet beam to traverse the first detection arm front focal plane. The first embodiments include variants that include a controller connected to a first camera to read image data therefrom, wherein the first detection arm includes a two-dimensional image detector of the camera, the controller reading and storing selected pixels of the image detector responsively to positions of the sheet beam waist, thereby causing the selected pixels to follow the traversal of the beam waist. The first embodiments include variants in which the controller controls the scanning components. The first embodiments include variants in which the scanning components include an electrically tunable lens configured to move the sheet beam waist along an axis of the illumination objective. The first embodiments include variants that include a traversing system, the controller configured to control the scanning components and to form an image slice from successive samples of the linear volume. The first embodiments include variants that include a second illumination arm identical to the first and configured to form a second sheet beam that intersects the first sheet beam. The first embodiments include variants in which the first and second illumination arm illumination objective optical axes each forms an angle to the surface of the first detection arm front focal plane. The first embodiments include variants in which each of the illumination arms includes a partial beam block which causes the sheet beam to be formed using a side portion of the illumination objective. The first embodiments include variants in which the angles of the sheet beams are responsive to the position of the beam block. The first embodiments include variants that include a controller connected to a traversal system, the controller is programmed to optically scan portions of a degree of freedom of the traversing system such that the traversing system can move in steps along an axis corresponding to the degree of freedom whose size is responsive to a dimension of the optical scan, to permit the capture of a sample larger than the dimension of the optical scan. The first embodiments include variants that include a second illumination arm and a second detection arm, both identical, respectively, to the first illumination and detection arms, the second illumination and detection arms is positioned on opposite sides of a movable stage. The first embodiments include variants that include cameras on each of the first and second illumination arms, a controller connected to first and second image detectors to read image data therefrom, wherein the first detection arms each includes a two-dimensional image detector of the camera, the controller reading and storing selected pixels of the image detector responsively to positions of the sheet beam waist, thereby causing the selected pixels to follow the traversal of the beam waist. The first embodiments include variants in which the controller is configured to control the sheet beams of the first and second illumination arms to maintain a distance between the intersections of the sheet beams and the front focal planes of the detection arms. The first embodiments include variants in which the controller is configured to control the sheet beams of the first and second illumination arms to maintain a distance between the intersections of the sheet beams and the front focal planes of the detection arms by maintain a phase difference between the scan cycling of the two sheet beams.

According to second embodiments, the disclosed subject matter includes a method of imaging an elongate volume within a sample. The method includes forming a sheet beam by passing a beam of light through a side of a first objective such that the beam is blocked from passing through a portion to a side of an optical axis of the first objective. The method includes detecting light from a linear volume illuminated by the sheet where the sheet intersects the focal plane of the first objective or a second objective. The forming includes scanning the illumination beam such that the linear volume traverses an axis that is perpendicular to an axis of the linear volume.

The second embodiments include variants in which the detecting includes sampling a line of pixels of a two-dimensional image plane of a camera, the line of pixels coinciding with an image of the linear volume. The second embodiments include variants in which the first objective or a second objective is the first objective. The second embodiments include variants in which the first objective or a second objective is a second objective. The second embodiments include variants in which the scanning includes traversing an axial position of the linear volume along an axis of the first objective. The second embodiments include variants in which the traversing an axial position includes actuating an electrically tunable lens. The second embodiments include variants that include repeating the forming and detecting on an opposite side of a single sample. The second embodiments include variants that include mechanically traversing a sample after each of the steps of scanning and repeating the forming and detecting at each position of the mechanically traversing and compositing the images corresponding to each scan to form a three-dimensional image of a sample.

According to third embodiments, the disclosed subject matter includes a microscope. A detection objective has optical axis is at a normal to a predefined plane defined by two axes of a traversing system. One or more illumination objectives are positioned and oriented to generate one or more light sheets at an angle oblique to the normal such that the light sheets enter the sample from the same side of the predefined plane as the detection objective.

The third embodiments include variants that include a detection arm that conveys light from the detection objective to a two-dimensional image sensor. The third embodiments include variants in which the image sensor is a sCMOS type sensor. The third embodiments include variants that include illumination arms that form beams that pass through the illumination objectives. The third embodiments include variants in which the illumination arms are configured to pass light asymmetrically through the illumination objectives such that the light sheets form an angle relative to the illumination objective optical axes. The third embodiments include variants in which the illumination arms each block a beam applied to a respective one of the illumination objectives. The third embodiments include variants that include a controller and scanning optics controlled by the controller in the illumination arms to cause an intersection between the light sheets and a front focal plane of the detection objective to traverse the front focal plane. The third embodiments include variants that include the controller captures a line of pixels of an imaging device corresponding to an image of an illuminated region located at the intersection.

According to embodiments, the disclosed subject matter includes a microscope. An imaging component has an imaging objective. A first light sheet projector is located on a same side of a sample region as the imaging component. The imaging component itself can include all the part of a conventional microscope, for example. The imaging objective and first light sheet projector have respective optical axes that intersect in the sample region. This occurs because of the way they are positioned and oriented in a common mounting with the microscope. A sample support is positioned and oriented with respect to the imaging objective such that, when a sample is placed on the sample support, the imaging objective optical axis is perpendicular to a surface of the sample.

In variations of the above microscope, the sample support is a generally flat element has a major plane and shaped to hold a slab-shaped sample, the imaging objective optical axis is perpendicular to the major plane. In further variations, which may be combined with the preceding variations, a second light sheet projector is also provided. The second light sheet projector has an optical axis forming an angle with the imaging objective optical axis equal to an angle formed by the first sheet projector optical axis with the imaging objective optical axis.

According to further embodiments, the disclosed subject matter includes a microscope with an imaging component, has an imaging objective, and a first light sheet projector located on a same side of a sample region. The imaging objective and first light sheet projector have respective axes that intersect in the sample region. A sample support is positioned to hold a sample in the sample region. The light sheet projector has light scanning and focusing optics to permit the selection of an axial position of a light sheet beam waist and the selection of a position of the light sheet along an axis perpendicular to the light sheet propagation direction. A controller is connected to control the light scanning and focusing optics to translate the beam waste along a linear path. The imaging objective optical axis are perpendicular to the linear path.

In variations of the foregoing microscope, the focusing optics include an electrically tunable lens (ETL). In further variations, the sample support is a generally flat element shaped to hold a slab-shaped sample. In further variations, a second light sheet projector has an optical axis forming an angle with the imaging objective optical axis equal to an angle formed by the first sheet projector optical axis with the imaging objective optical axis.

In still further variations, one or more further light sheet projectors and an imaging component are arranged on an opposite side of the sample region such that two opposite faces of a sample can be scanned. In still further variations, a translating stage is connected to move the sample support to permit the sequential scanning of portions of a sample.

According to embodiments, the disclosed subject matter includes a microscope with an imaging objective and a first light sheet projector located on a same side of a sample region. The imaging objective and first light sheet projector have respective optical axes that intersect in the sample region. A sample support is provided on a translating stage that translates the sample support along at least one linear axis. The translating stage is positioned and oriented with respect to the imaging objective such that the imaging objective optical axis is perpendicular to the at least one linear axis.

The sample support may be a generally flat element has a major plane and shaped to hold a slab-shaped sample, the imaging objective optical axis is perpendicular to the major plane. A second light sheet projector may be provided having an optical axis forming an angle with the imaging objective optical axis equal to an angle formed by the first sheet projector optical axis with the imaging objective optical axis.

Any of the microscope embodiments may include one or more further light sheet projectors and an imaging component arranged on an opposite side of the sample region such that two opposite faces of a sample can be scanned and/or a translating stage connected to move the sample support to permit the sequential scanning of portions of a sample.

According to embodiments, the disclosed subject matter includes an imaging instrument including a microscope with an objective has an optical axis. A first light beam projector has imaging optics separate from the microscope positioned to direct a beam of light that crosses the optical axis. The first light beam projector forms a sheet has a beam waist in the form of a line of maximum intensity. The first light beam projector has a scanning mechanism that scans the line of maximum intensity through a range of positions along a scan direction perpendicular to the line of maximum intensity. The microscope objective optical axis is perpendicular to the scan direction.

In the imaging instrument, the objective and the light beam projector are located on a same side of a sample volume such that an extended slab-shaped sample can be scanned by moving the sample relative to the objective and the light beam projector. In the imaging instrument and any variations thereof, a traversing system may be connected to one or both of the microscope and a sample support to move them such that a slab-shaped sample can be scanned. In the imaging instrument and any variations thereof, the traversing system is an X-Y traversing system. In the imaging instrument and any variations thereof, the traversing system is an X-Y traversing system, where X and Y axes are perpendicular to the optical axis. In the imaging instrument and any variations thereof, a controller may be connected to the traversing system and scanning mechanism to scan each of multiple tile segments of a sample using the scanning mechanism and to shift the sample support relative to the microscope to scan additional tile segment. In the imaging instrument and any variations thereof, the scanning mechanism includes electrically tunable lens (ETL). In the imaging instrument and any variations thereof, the ETL may change a position of the line of maximum intensity along a length of the sheet in the direction of propagation of the sheet.

In the imaging instrument and any variations thereof, the scanning mechanism includes a light redirector that scans the sheet such that the line of maximum intensity traverses an axis perpendicular to a direction of propagation of the sheet. In the imaging instrument and any variations thereof, the scanning mechanism may include a light redirector that scans the sheet such that the line of maximum intensity traverses an axis perpendicular to a direction of propagation of the sheet. In the imaging instrument and any variations thereof, the scanning mechanism may include a light redirector that scans the sheet such that the line of maximum intensity traverses an axis perpendicular to a direction of propagation of the sheet.

In the imaging instrument and any variations thereof, the light redirector may include a galvo-motor. In the imaging instrument and any variations thereof, the light redirector may include a galvo-mirror. In the imaging instrument and any variations thereof, the scanning mechanism may scan in two axes, one to changes a position of the line of maximum intensity along a length of the sheet in the direction of propagation of the sheet and one to change the position of the line of maximum intensity along an axis perpendicular to the direction of propagation of the sheet. In the imaging instrument and any variations thereof, the scanning mechanism may scan in two axes, one to changes a position of the line of maximum intensity along a length of the sheet in the direction of propagation of the sheet and one to change the position of the line of maximum intensity along an axis perpendicular to the direction of propagation of the sheet. In the imaging instrument and any variations thereof, the scanning mechanism may include an electrically tunable lens (ETL) to change the position of the line of maximum intensity along a length of the sheet in the direction of propagation of the sheet.

According to embodiments, the disclosed subject matter includes an imaging instrument that includes a microscope with an objective. A first light beam projector has imaging optics separate from the microscope positioned to direct a beam of light that crosses the optical axis. The first light beam projector forms a sheet that has a beam waist in the form of a line of maximum intensity. The first light beam projector has a scanning mechanism that scans the line of maximum intensity through a range of positions along a scan direction perpendicular to the line of maximum intensity.

In variations, the objective and the light beam projector are located on a same side of a sample volume such that an extended slab-shaped sample can be scanned by moving the sample relative to the objective and the light beam projector. According to embodiments, the disclosed subject matter includes the microscopes include a traversing system connected to one or both of the microscope and a sample support to move them such that a slab-shaped sample can be scanned. In variations, the traversing system is an X-Y traversing system. In variations, the traversing system is an X-Y-Z traversing system, where X and Y axes are parallel to a major plane of the sample volume and the Z axis is perpendicular thereto. In variations, a controller is connected to the traversing system and scanning mechanism to scan each of multiple tile segments of a sample using the scanning mechanism and to shift the sample support relative to the microscope to scan additional tile segment. In variations, the scanning mechanism includes electrically tunable lens (ETL). In variations, the ETL changes a position of the line of maximum intensity along a length of the sheet in the direction of propagation of the sheet. In variations, the scanning mechanism includes a light redirector that scans the sheet such that the line of maximum intensity traverses an axis perpendicular to a direction of propagation of the sheet. In variations, the scanning mechanism includes a light redirector that scans the sheet such that the line of maximum intensity traverses an axis perpendicular to a direction of propagation of the sheet. In variations, the scanning mechanism includes a light redirector that scans the sheet such that the line of maximum intensity traverses an axis perpendicular to a direction of propagation of the sheet. In variations, the light redirector includes a galvo-motor. In variations, the light redirector includes a galvo-mirror. In variations, the scanning mechanism scans in two axes, one to changes a position of the line of maximum intensity along a length of the sheet in the direction of propagation of the sheet and one to change the position of the line of maximum intensity along an axis perpendicular to the direction of propagation of the sheet. In variations, the scanning mechanism scans in two axes, one to changes a position of the line of maximum intensity along a length of the sheet in the direction of propagation of the sheet and one to change the position of the line of maximum intensity along an axis perpendicular to the direction of propagation of the sheet. In variations, wherein the scanning mechanism includes electrically tunable lens (ETL) to change the position of the line of maximum intensity along a length of the sheet in the direction of propagation of the sheet.

According to embodiments, the disclosed subject matter includes a method of acquiring a three-dimensional image of a sample. The method includes projecting a beam of light into a sample, the beam has a line of maximum intensity perpendicular to a direction of propagation of the beam and scanning the beam to scan the line of maximum intensity along a path oblique to both the direction of propagation and perpendicular to it. The method may include capturing images of the line on respective portions of an imaging transducer. The method may be such that, additionally or alternatively, such that the imaging transducer includes a camera sensor. The method may be such that, additionally or alternatively, such that the capturing includes imaging light from the line using a microscope. The method may be such that, additionally or alternatively, such that the capturing includes receiving and imaging secondary light induced by the line of maximum intensity. The method may be such that, additionally or alternatively, such that the capturing includes receiving and imaging a region of fluorescence induced by the line of maximum intensity. The method may be such that, additionally or alternatively, such that the scanning includes mechanically moving the end of a wave guide. The method may include, additionally or alternatively, moving the sample relative to the microscope and the beam of light and repeating the scanning and capturing for a different region of the sample. The method may include, additionally or alternatively, creating two-dimensional images from the capturing and stitching them together to form larger composite images by matching features of the edges of the images. The method may be such that, additionally or alternatively, such that the moving includes moving in one or all of three orthogonal directions. The method may be such that, additionally or alternatively, such that the moving includes moving in all of three orthogonal directions to traverse a three-dimensional volume of positions.

The method may include, additionally or alternatively, changing the focus of an imaging device to optically discriminate multiple depths of the sample after each scan of the scanning. The method may be such that, additionally or alternatively, such that the light sheet projector includes a GRIN lens as an objective.

According to embodiments, the disclosed subject matter includes a microscopy method that includes positioning a detection objective oriented with its optical axis perpendicular to a facing surface of a sample slab. The method further includes positioning an excitation objective oriented to form an acute angle with the detection objective optical axis. The positioning a detection objective and the positioning an excitation objective is such that the detection and excitation objectives is on a same side of the sample slab. The method further includes applying light off-center to the back aperture of the excitation objective such that a beam emerges at an angle with respect to an optical axis of the excitation objective and with a major axis parallel to its direction of propagation that forms a larger angle than the acute angle.

The method may be such that, additionally or alternatively, such that the applying includes partially optically blocking the back aperture. The method may be such that, additionally or alternatively, such that the major axis forms a more acute angle with the facing surface than the detection objective optical axis.

According to embodiments, the disclosed subject matter includes a microscopy method that includes arranging a detection objective of a microscope with its optical axis normal to a surface of a sample slab and injecting light along directions forming equal and opposite angles with the detection objective optical axis. The method includes imaging light resulting from the injecting using the microscope. The method may be such that, additionally or alternatively, such that the light resulting from the injecting includes fluorescence. The method may be such that, additionally or alternatively, such that the injecting results in a single line-shaped region of maximum light intensity in the sample. The method may include, additionally or alternatively, scanning the region perpendicular to a major axis thereof to trace out a planar segment of the sample while sampling the light resulting from the injecting using a light sensor.

The method may be such that, additionally or alternatively, such that the sensor includes a camera. The method may be such that, additionally or alternatively, such that the imaging includes receiving the resulting slight through a microscope. The method may be such that, additionally or alternatively, such that the detection objective is an objective of a microscope.

The method may, additionally or alternatively, include scanning the region perpendicular to a major axis thereof to trace out a planar segment of the sample that is parallel to the sample surface while sampling the light resulting from the injecting using a light sensor.

According to embodiments, the disclosed subject matter includes a microscope with at least two excitation optical elements arranged to form and direct respective sheets of light such that they intersect to form an illuminated line of intersection in a sample region, the sheets has major planes that form angles of at least 75 degrees. A detection optical element is arranged with respect to the excitation optical elements with an optical axis forming equal angles with the major planes of the sheets.

In variations of the microscope, at least two excitation optical elements include objective lenses. In further variations of the microscope, at least two excitation optical elements include objective lenses each has an adjustable partial beam block to cause the sheet beam to be emerge from a side portion of the objective. In further variations of the microscope at least two excitation optical elements include GRIN lenses. In further variations of the microscope the two excitation optical elements include scanning optical elements arranged to cause the illuminated line to traverse the sample region. In further variations of the microscope the two excitation optical elements include scanning optical elements arranged to cause the illuminated line to traverse the sample region along a focal plane of the detection optical element. In further variations of the microscope a traversing system is provided and the controller is configured to control scanning components and to form an image slice from successive detections of the sample region.

According to embodiments, the disclosed subject matter includes a microscope. First and second imaging components, each have an imaging objective, and first and second light sheet projectors each located on a same side of a sample region as a respective on of the first and second imaging components. Each imaging objective and each light sheet projector has respective axes that intersect in the sample region. A sample support is positioned to hold a sample in the sample region. Each light sheet projector has light scanning and focusing optics to permit the selection of an axial position of a light sheet beam waist and the selection of a position of the light sheet along an axis perpendicular to the light sheet propagation direction. A controller is connected to control the light scanning and focusing optics to translate the beam waste of each light sheet projector independently along a respective linear path.

In variations, the imaging objective optical axes are perpendicular to a respective one of the linear paths. In variations, the imaging objective optical axes are perpendicular to a both of the linear paths. In variations, the focusing optics include an electrically tunable lens (ETL). In variations, the sample support is a generally flat element shaped to hold a slab-shaped sample. It will be appreciated that the modules, processes, systems, and sections described above can be implemented in hardware, hardware programmed by software, software instruction stored on a non-transitory computer readable medium or a combination of the above. For example, a method for capturing three dimensional optical images can be implemented, for example, using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the modules, processes, systems, and sections can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of control systems, kinematic design, optics, microscopy and/or computer programming arts.

Moreover, embodiments of the disclosed method, system, and computer program product can be implemented in software executed on a programmed general purpose computer, a special purpose computer, a microprocessor, or the like.

It is, thus, apparent that there is provided, in accordance with the present disclosure, optical imaging systems, devices, and methods. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. An microscope comprising:
   an imaging component, with an imaging objective, and a first light sheet projector located on a same side of a sample region;
   the imaging objective and first light sheet projector having respective axes that intersect in the sample region at an angle of less than 90 degrees;
   a sample support positioned to hold a sample in said sample region;
   the first light sheet projector having light scanning and focusing optics to permit the selection of an axial position of a light sheet beam waist and the selection of a position of the light sheet along an axis perpendicular to the light sheet propagation direction;
   a controller connected to control the light scanning and focusing optics to translate the beam waist along a linear path;
   the imaging objective optical axis being perpendicular to said linear path.

2. The microscope of claim 1, wherein the focusing optics include an electrically tunable lens (ETL).

3. The microscope of claim 1, wherein the sample support is a generally flat element shaped to hold a slab-shaped sample.

4. The microscope of claim 1, further comprising a second light sheet projector with an optical axis forming an angle with said imaging objective optical axis equal to an angle formed by said first light sheet projector optical axis with said imaging objective optical axis.

5. The microscope of claim 1, further comprising one or more further light sheet projectors and an imaging component arranged on an opposite side of the sample region such that two opposite faces of a sample can be scanned.

6. The microscope of claim 1, further comprising a translating stage connected to move said sample support to permit the sequential scanning of portions of a sample.

7. An imaging instrument, comprising:
   a microscope with an objective having an optical axis;
   a first light beam projector with imaging optics separate from said microscope positioned to direct a beam of light that crosses said optical axis at an angle of less than 90 degrees, wherein the objective and the light beam projector are located on a same side of a sample volume; and
   the first light beam projector forming a sheet having a beam waist in the form of a line of maximum intensity;
   the first light beam projector having a scanning mechanism that scans the line of maximum intensity through a range of positions along a scan direction perpendicular to the line of maximum intensity.

8. The imaging instrument of claim 7, wherein the microscope objective has an optical axis that is perpendicular to the scan direction.

9. The imaging instrument of claim 7, wherein the objective and the light beam projector are positioned such that an extended slab-shaped sample can be scanned by moving the sample relative to the objective and the light beam projector.

10. The imaging instrument of claim 7, wherein the scanning mechanism scans in two axes, one to change a position of the line of maximum intensity along a length of the sheet in the direction of propagation of the sheet and one to change the position of the line of maximum intensity along an axis perpendicular to the direction of propagation of the sheet.

11. The imaging instrument of claim 7, wherein the angle of less than 90 degrees is as close to 90 degrees as allowed by the geometry.

12. The imaging instrument of claim 7, wherein the angle of less than 90 degrees is between 37.5 and 75 degrees.

13. The imaging instrument of claim 7, further comprising a traversing system connected to one or both of the microscope and a sample support to move them such that a slab-shaped sample can be scanned.

14. The imaging instrument of claim 13, wherein the traversing system is an X-Y traversing system.

15. The imaging instrument of claim 13, wherein the traversing system is an X-Y-Z traversing system, where X and Y axes are parallel to a major plane of the sample volume and the Z axis is perpendicular thereto.

16. The imaging instrument of claim 13, further comprising a controller connected to the traversing system and scanning mechanism to scan each of multiple tile segments of a sample using the scanning mechanism and to shift the sample support relative to the microscope to scan additional tile segment.

17. The imaging instrument of claim 7, wherein the scanning mechanism includes electrically tunable lens (ETL).

18. The imaging instrument of claim 17, wherein the ETL changes a position of the line of maximum intensity along a length of the sheet in the direction of propagation of the sheet.

19. The imaging instrument of claim 18, wherein the scanning mechanism includes a light redirector that scans the sheet such that the line of maximum intensity traverses an axis perpendicular to a direction of propagation of the sheet.

20. The imaging instrument of claim 17, wherein the scanning mechanism includes a light redirector that scans the sheet such that the line of maximum intensity traverses an axis perpendicular to a direction of propagation of the sheet.

21. The imaging instrument of claim 20, wherein the light redirector includes a galvo-motor.

* * * * *